United States Patent

Meulblok et al.

(10) Patent No.: US 10,545,166 B2
(45) Date of Patent: Jan. 28, 2020

(54) OPTICAL SENSOR DEVICE, SENSOR APPARATUS AND CABLE COMPRISING SUCH DEVICE

(71) Applicant: Fugro Technology B.V., Leidschendam (NL)

(72) Inventors: Bastiaan Meulblok, The Hague (NL); German Enrique Knoppers, The Hague (NL); Devrez Mehmet Karabacak, Leidschendam (NL); Yorick Koumans, The Hague (NL); Rolf Oosterveer, The Hague (NL)

(73) Assignee: Fugro Technology B.V. (NL)

( * ) Notice: Subject to any disclaimer, the term of this patent is extended or adjusted under 35 U.S.C. 154(b) by 113 days.

(21) Appl. No.: 15/572,618

(22) PCT Filed: May 8, 2015

(86) PCT No.: PCT/NL2015/050318
§ 371 (c)(1),
(2) Date: Nov. 8, 2017

(87) PCT Pub. No.: WO2016/182429
PCT Pub. Date: Nov. 17, 2016

(65) Prior Publication Data
US 2018/0136250 A1    May 17, 2018

(51) Int. Cl.
*G01P 15/093*    (2006.01)
*G01L 1/02*    (2006.01)
(Continued)

(52) U.S. Cl.
CPC .............. *G01P 15/093* (2013.01); *G01L 1/02* (2013.01); *G01L 1/242* (2013.01); *G01V 1/226* (2013.01)

(58) Field of Classification Search
CPC ......... G01L 11/025; G01L 1/02; G01L 1/242; G01P 15/093; G01P 15/18; G01V 1/226
See application file for complete search history.

(56) References Cited

U.S. PATENT DOCUMENTS 5,661,245 A    8/1997 Svoboda et al.
6,175,108 B1    1/2001 Jones et al.
(Continued)

FOREIGN PATENT DOCUMENTS

DE    10012747 A1    2/2002

OTHER PUBLICATIONS

International Search Report and Written Opinion; PCT Application No. PCT/NL2015/050318; dated Jan. 1, 2016.
(Continued)

*Primary Examiner* — Helen C Kwok
(74) *Attorney, Agent, or Firm* — Polsinelli PC

(57) ABSTRACT

The invention relates to an optical sensor device comprising a reference body, an optical fiber including an intrinsic fiber optic sensor, and a hydraulic transmission system. The hydraulic transmission system is connected to the reference body such that an input portion and an output portion are movable with respect to the reference body. The optical fiber is connected with a first connecting portion to the output portion of the hydraulic transmission system and with a second connecting portion to an element exterior to the hydraulic transmission system. The intrinsic sensor is positioned between the first and second connecting portion. The input portion is arranged for receiving an input action and the hydraulic transmission system is arranged for converting the input action to a sensing action applied to the optical fiber by the output portion such as to modify strain in the optical fiber dependent on said input action.

31 Claims, 9 Drawing Sheets

(51) Int. Cl.
*G01V 1/22* (2006.01)
*G01L 1/24* (2006.01)

(56) References Cited

U.S. PATENT DOCUMENTS

| | | | | |
|---|---|---|---|---|
| 6,422,084 B1* | 7/2002 | Femald | ............... | G01L 11/025 |
| | | | | 250/231.19 |
| 6,703,635 B2* | 3/2004 | Yashiro | ............... | G01F 23/0038 |
| | | | | 250/577 |
| 7,832,276 B2* | 11/2010 | Wu | ............... | G01L 9/0079 |
| | | | | 73/705 |
| 8,402,834 B1* | 3/2013 | Moslehi | ............... | G01L 9/0076 |
| | | | | 73/705 |
| 2002/0009252 A1* | 1/2002 | Maron | ............... | G01L 1/246 |
| | | | | 385/12 |
| 2002/0154860 A1* | 10/2002 | Femald | ............... | G01L 11/025 |
| | | | | 385/37 |
| 2004/0165809 A1* | 8/2004 | Kersey | ............... | E21B 47/123 |
| | | | | 385/12 |
| 2004/0182166 A1 | 9/2004 | Jones et al. | | |
| 2004/0237648 A1 | 12/2004 | Jones et al. | | |
| 2005/0210989 A1* | 9/2005 | Ja | ............... | G01L 11/02 |
| | | | | 73/705 |
| 2005/0274194 A1* | 12/2005 | Skinner | ............... | E21B 47/06 |
| | | | | 73/736 |
| 2007/0292071 A1* | 12/2007 | Zerwekh | ............... | E21B 47/06 |
| | | | | 385/12 |
| 2008/0212917 A1* | 9/2008 | Chen | ............... | G01D 5/35303 |
| | | | | 385/12 |
| 2011/0178413 A1* | 7/2011 | Schmitt | ............... | A61B 5/0066 |
| | | | | 600/478 |
| 2014/0123764 A1 | 5/2014 | Abtahi et al. | | |
| 2015/0260607 A1* | 9/2015 | Fuller | ............... | G01M 15/14 |
| | | | | 356/73.1 |
| 2016/0187515 A1* | 6/2016 | De Jong | ............... | G01L 11/025 |
| | | | | 367/15 |
| 2018/0364122 A1* | 12/2018 | Karabacak | ............... | G01L 11/025 |

OTHER PUBLICATIONS

English abstract of DE10012747; retrieved from www.espacenet.com on Nov. 7, 2017.

\* cited by examiner

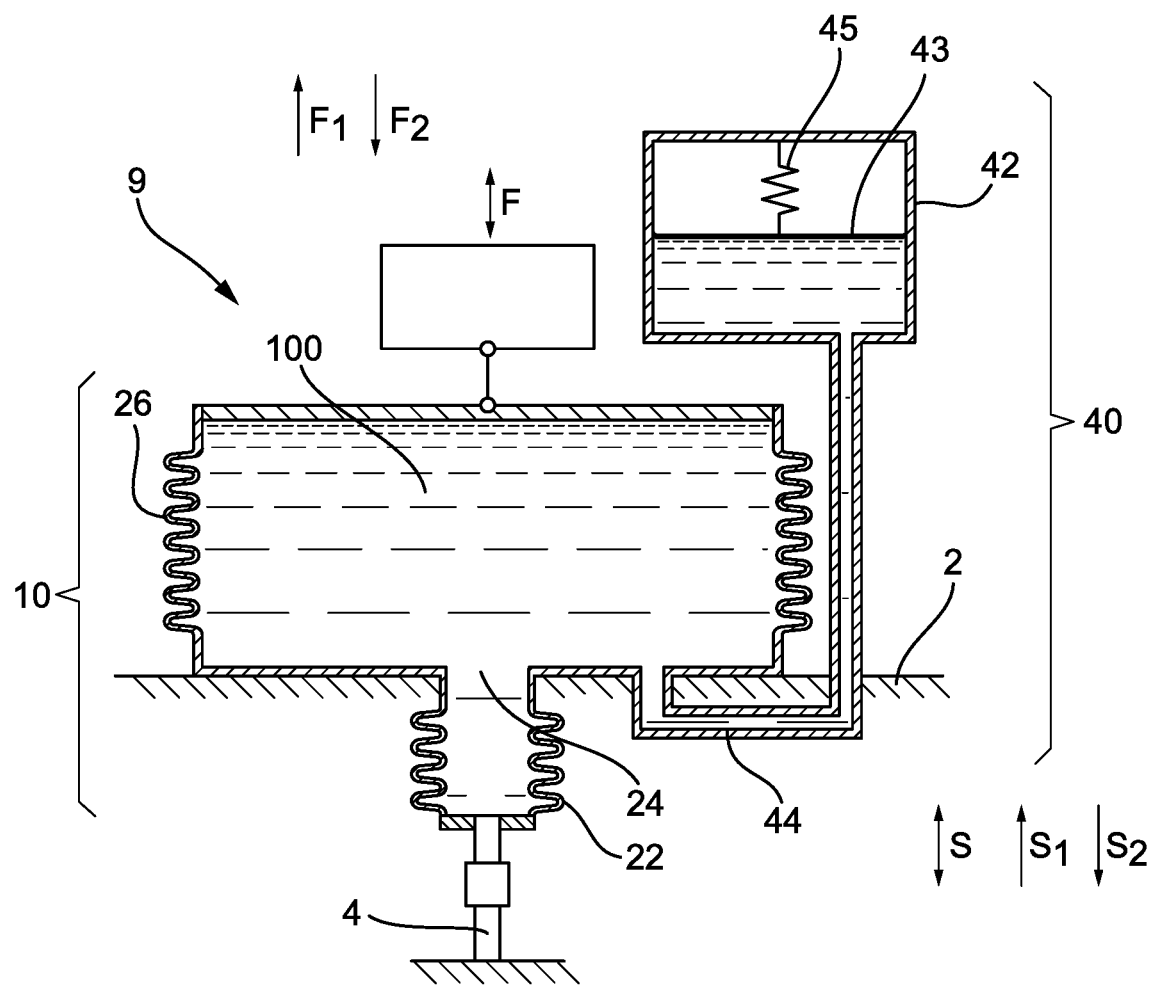

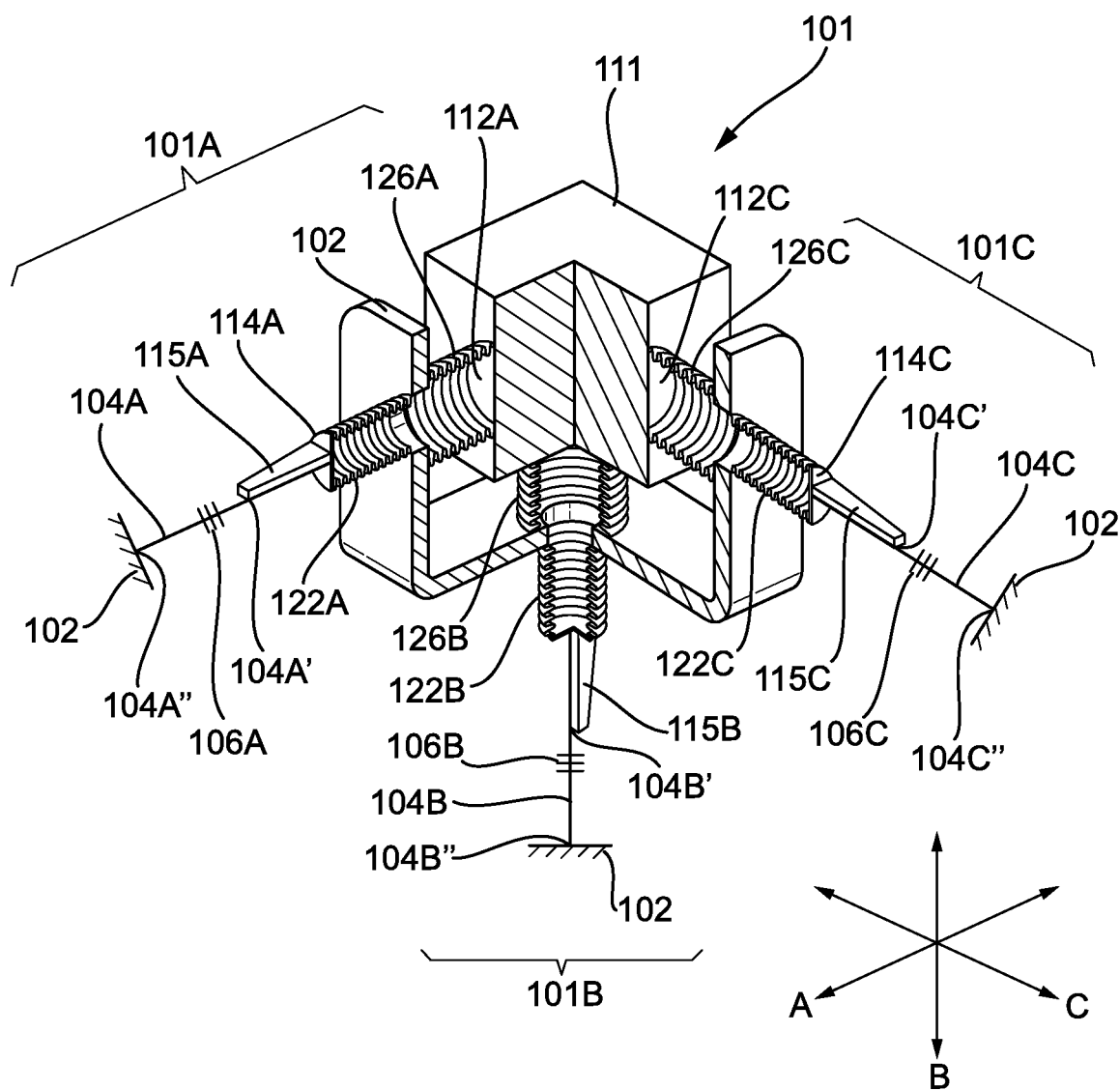

OPTICAL SENSOR DEVICE, SENSOR APPARATUS AND CABLE COMPRISING SUCH DEVICE

CROSS-REFERENCE TO RELATED APPLICATIONS

This application is a national stage application of International Application No. PCT/NL2015/050318, which was filed on May 8, 2015, of which is incorporated by reference in its entirety.

FIELD OF THE INVENTION

The present invention relates to an optical sensor device, in particular an optical sensor device applying an intrinsic fiber optic sensor.

BACKGROUND

A known class of optical sensors for various applications includes the use of intrinsic fiber optic sensors. An intrinsic fiber optic sensor is a sensor that uses an optical fiber as the sensing element. In many applications the intrinsic fiber optic sensor is lit (e.g. by a laser), and a change in the fiber due to an external cause (dependent on the type of sensor) results in a measurable change in the optical signal transmitted by or received from the sensor. A typical example of an intrinsic fiber optic sensor is a Fiber Bragg Grating (FBG).

An FBG comprises a fiber having a core including therein, over a certain distance, a periodic variation of the refractive index. This periodic variation forms a wavelength-specific dielectric mirror, wherein light in a specific (narrow) range around and including a certain wavelength is reflected. The wavelength reflected is determined by the periodicity of the refractive index of the core. The FBG is based on the principle that a difference in strain of the optical fiber causes the geometric periodicity of the variations to change. This results in a change of the reflected wavelength, which change can be detected (e.g. by spectral analysis, or using an interferometer).

Fiber Bragg Gratings are applied in many applications for measuring a wide range of parameters and characteristics, including static and dynamic parameters. For example, a FBG may be applied in a pressure sensor by converting an exerted exterior pressure into a variable force applied to the fiber including the FBG. Another application, usable for example to perform geological survey, is the application of a FBG in an accelerometer e.g. for measuring soil vibrations. Such sensors are advantageously applied for example in the oil and gas industry.

For many of these applications, it is desirable that the size of the optical sensor device is compact and/or that the device can be readily integrated into an apparatus to facilitate sensing, for example, to enable integration of the sensor in a cable that may be useable for exploration and/or geological survey at land, at sea or in a borehole, or to measure vibrations in a building, a bridge or other construction. However, achieving the desired size reduction and/or design often comes at the cost of sensitivity of the sensor, and this trade-off is usually not desired. Moreover, sensitivity and size are not the only characteristics that are of interest. In particular for dynamic sensors, a broad dynamic operational frequency range is desired. An upper limit of this operational frequency range is determined by the resonance frequency of the sensor device. Even for static sensors, fast and accurate response to variations is often required. Matching all these requirements in an optical fiber design is complex because they are related to each other, and meeting one requirement often deteriorates the design for another requirement.

SUMMARY OF THE INVENTION

It is an object of the present invention to provide a compact optical sensor device designed for easy implementation and/or integration, which is highly sensitive across a broad operational frequency range.

To this end, there is provided herewith an optical sensor device comprising a reference body, an optical fiber including an intrinsic fiber optic sensor, and a hydraulic transmission system including an input portion in hydraulic communication with an output portion. The hydraulic transmission system is connected to the reference body such that the input portion and output portion are movable with respect to the reference body. The optical fiber is connected with a first connecting portion thereof to the output portion of the hydraulic transmission system and with a second connecting portion thereof to an element exterior to the hydraulic transmission system. The intrinsic fiber optic sensor is positioned between the first connecting portion and the second connecting portion. The input portion of the hydraulic transmission system is arranged for receiving an input action and the hydraulic transmission system is arranged for converting the input action received by the input portion of the hydraulic transmission system to a sensing action applied to the optical fiber by the output portion such as to modify strain in the optical fiber dependent on said input action.

Therefore the optical sensor device of the present invention includes a hydraulic transmission system for converting an input action received by the input portion to a sensing action acting on the optical fiber, which is measurable by interrogation of the intrinsic fiber optical sensor. The input action may be a vibration or pressure variation which results in a force applied to the input portion of the hydraulic transmission system.

Optionally, the intrinsic fiber optic sensor comprises at least one of a Fiber Bragg Grating, a photonic crystal fiber, a birefringent fiber, a fiber laser, or a multicore fiber. Such intrinsic fiber optic sensors exhibit a change in optical characteristics in response to a sensing action applied to the fiber, for example strain. These changes can be interrogated via the fiber using for example a laser.

The intrinsic fiber optic sensor is included in the portion of the fiber between the first connecting portion and the second connecting portion such that a sensing action applied by the output portion of the hydraulic transmission system causes a change in strain exerted on the fiber optic sensor resulting in a change in optical characteristics of the sensor that are measurable.

It is conceivable that that the first connecting portion of the fiber is connected to the output portion by a connecting element. This may facilitate the connection between the output portion and the first connecting portion of the fiber. However, it is the output portion that applies the sensing action.

The optical fiber may be pre-stressed such as to be tensed between its first connecting portion and the said optical fiber thereby acting as a spring having a first spring constant of positive value. In this way a wide range of sensing actions can be sensed while the fiber remains tensed. Preferably, the optical fiber has a spring constant of 10-100 N/mm.

It will be appreciated that the optical fiber extends between the first connecting portion and the second connecting portion in a direction that is substantially parallel to a direction of the sensing action applied by the output portion of the hydraulic transmission system. In this way, the fiber is stretched substantially longitudinally. In this configuration the fiber is efficiently stretched.

Optionally, the optical fiber is connected with a first connecting portion thereof to an exterior portion of the output portion of the hydraulic transmission system. It will be appreciated that the exterior portion of the output portion is external to the hydraulic transmission system and is not in fluid communication with the fluid of the hydraulic transmission system. Optionally, the fiber is exterior to the hydraulic transmission system. In other words, the fiber is completely exterior to the hydraulic transmission system, and the fiber and a cladding of the fiber is free from contact with the hydraulic fluid. The fiber does not travel through the hydraulic transmission system. In this way the fiber is independent of the hydraulic transmission system and can be easily installed are replaced. Similarly, a hydraulic transmission system may be replace without rerunning the optical fibers. This is especially of interest in complex sensing system, such a seismic cables, where numerous fibers are routed through a single cable.

Optionally, the optical fiber is connected with the second connecting portion thereof to at least one of a group comprising the reference body and a further element that is fixed relative to the reference body.

The hydraulic transmission system includes an input portion in hydraulic communication with an output portion. By this it is meant that that an input action received by the input portion is communicated to the output portion according to a transmission ratio by the displacement of a hydraulic fluid. The hydraulic transmission system is arranged to be filled with a hydraulic fluid or liquid. Generally the hydraulic transmission system is filled with an incompressible fluid or liquid. Both the input portion and the output portion are movable with respect to the reference body, and thus to be in hydraulic communication implies that movement of one of the input portion and the output portion results in the movement of the other portion according to the transmission ratio. Thus the input portion is in fluid communication with the output portion.

The transmission ratio T of the hydraulic transmission system determines relationship between the input action received by the input portion of the hydraulic transmission system and the sensing action applied by the output portion of the hydraulic transmission system. Generally, the transmission ratio T of the hydraulic transmission system can be defined as a ratio of an effective surface area of input portion in hydraulic communication with the output portion to an effective surface area of the output portion in hydraulic communication with the input portion. The effective surface area can be defined as a volume of liquid displaced by the respective portion, e.g. input portion or output portion, divided by a distance travelled by a connection point located on the respective portion. For example, the connection point may be defined as a center of the respective portion. In the case of a membrane the connection point may be chosen to be a center of the membrane.

The transmission ratio of hydraulic transmission system can be used to tune the achievable resonance frequency and sensitivity in the optical sensor device. Sensitivity and operation (frequency) bandwidth are two of the main performance criteria for dynamic (fiber optic) sensors. The operation bandwidth of (fiber optic) sensors are often limited by the mechanical resonance frequency of the transducer assembly as it is highly desirable to operate the sensors at frequencies significantly below resonance frequency. As such, there exists a need to push the resonance to higher frequencies as much as possible while maintaining sufficient sensitivity. However, added inertia and decrease of system rigidity are both factors that lower the resonance frequency undesirably.

Optionally, the hydraulic transmission system has a transmission ratio T greater than 1. This is especially advantageous in movement restricted applications, for example when sensing vibrations in a building foundation. In this way, the force applied to the fiber is reduced thereby increasing operational frequency and increasing rigidity of the fiber optical sensor device. This results in a loss of sensitivity, but allows the sensor to operate at a wider range of frequencies below the resonance frequency.

Optionally, an effective surface area of the input portion in hydraulic communication with the output portion is greater than an effective surface area of the output portion in hydraulic communication with the input portion. In this way, a transmission ratio T larger than 1 is achieved.

Optionally, the hydraulic transmission system has a transmission ratio less than 1. This is especially advantageous in force restricted applications. In this way, the force applied to the fiber is increased thus increasing the sensitivity of the optical sensor device. This results in a decrease in operational frequency and a decrease in rigidity of the fiber optical sensor device. The sensor is operable for a narrower range of frequencies, but is more sensitive.

Optionally, an effective surface area of the input portion in hydraulic communication with the output portion is less than an effective surface area of the output portion in hydraulic communication with the input portion. In this way a transmission ratio T smaller than 1 is achieved.

As seen above, the hydraulic transmission system allows tuning of the achievable operation frequency range and sensitivity in dynamic sensor. Depending on the characteristics of the hydraulic transmission system, it either amplifies the sensitivity or increase the operational frequency range of the sensor. In certain applications it may be desirable to increase sensitivity at the cost of operational frequency or to increase the operational frequency resulting in a reduction of sensitivity. Advantageously, the optical sensor device of the present invention allows for a compact and adaptable design, while achieving the desired transmission ration.

In order to improve transmission efficiency and thus reduce system losses, it is desirable to use highly incompressible liquids in the hydraulic system such as silicone oil. This results in a more reliable sensor with minimum transmission loss. Preferably, the oil compressibility modulus is greater than 1 GPa. This has been found to keep the transmission losses sufficiently low.

Optionally, the input portion of the hydraulic transmission system is configured to receive an input action having a direction preferably substantially parallel to or along a preferred axis of the sensor device. The preferred axis of the optical sensor device may be substantially parallel to a direction in which the input portion is movable, or expressed otherwise the preferred axis of the sensor device extends substantially perpendicular to a surface of the input portion in hydraulic communication with the output portion of the hydraulic transmission system. Similarly, the sensing action applied by the output portion of the hydraulic transmission system is applied in a direction substantially parallel to a direction in which the output portion is movable, or expressed otherwise, to a direction substantially perpendicular to a surface of the output portion in hydraulic communication with the input portion. Advantageously, through the use of a hydraulic transmission system, the direction of the input action can be made independent of the direction of the sensing action. Thereby increasing design freedom of the optical sensor device. This in turn leads to more versatility and adaptable optical sensors.

Optionally, the fiber extends between the first connecting portion and the second connecting portion in a direction substantially parallel to a direction of the input action that the input portion is configured to receive. Optionally, the output portion is configured to apply a sensing action in a sensing direction parallel to the direction of the input action that the input portion is configured to receive.

Optionally, the fiber extends between the first connecting portion and the second connecting portion in a direction substantially perpendicular to the input action the input portion is configured to receive. Optionally, the output portion is configured to apply a sensing action in a sensing direction perpendicular to the direction of the input action that the input portion is configured to receive.

Thus the hydraulic transmission system allows the redirection of the input action without complicated mechanics or major transmission loss. This allows for a more flexible design layout of the sensor.

Optionally, the input portion is a flexible membrane, and the hydraulic transmission system includes an input hydraulic chamber having a first open end in fluid communication with the output portion and a second end closed off by the flexible membrane. In this case, the input portion is a flexible membrane that is hydraulically connected to the output portion such that an input action received by the flexible membrane results in a sensing action to be applied by the output portion. The input chamber may be a cylinder in such a case the effective surface area of the flexible membrane is determined on the basis of the diameter of the cylinder. It will be appreciated that for a flexible membrane the effective surface area may be less than the actual surface area of the membrane as the membrane doesn't move uniformly. This may result from the way the edges of the membrane are attached.

Optionally, the input portion is a movable input piston, and the hydraulic transmission system includes an input hydraulic chamber having a first open end in fluid communication with the output portion and wherein the movable input piston is received in the input hydraulic chamber. In this case, the input portion is a piston movably received in the input hydraulic chamber that is hydraulically connected to the output portion such that an input action received by the piston results in a sensing action to be applied by the output portion. The input chamber may be a cylinder, in such a case the effective surface area of the piston is determined substantially by the diameter of the cylinder.

Optionally, the hydraulic transmission system includes an input bellows having a first open end and a second closed end, wherein the first open end is in fluid communication with the output portion, and wherein the input portion of the hydraulic transmission system is the second closed end of the bellows. In this case, the input portion is the second closed off end of the bellows that is hydraulically connected to the output portion such that an input action received by the second closed off end of the bellows results in a sensing action to be applied by the output portion. The bellows may be cylindrical. In this case, the effective surface area of the input portion is determined substantially by the diameter of the closed end of the bellows. It will be appreciated that bellows may be closed off by the bellows itself or by another suitable element.

Optionally, the output portion is a flexible membrane, and the hydraulic transmission system includes an output hydraulic chamber having a first open end in fluid communication with the input portion and a second end closed off by the flexible membrane. In this case, the output portion is a flexible membrane that is hydraulically connected to the input portion such that an input action received by the input portion results in a sensing action applied by the flexible membrane. The output chamber may be a cylinder. In such a case the effective surface area of the flexible membrane is determined on the basis of a diameter of the cylinder. As mentioned above, for a flexible membrane the effective surface area may be less than the actual surface area of the membrane as the membrane doesn't move uniformly. This may result from the way the edges of the membrane are attached.

Optionally, the output portion is a movable output piston, and the hydraulic transmission system includes an output hydraulic chamber having a first open end in fluid communication with the input portion and wherein the movable output piston is received in the output hydraulic chamber. In this case, the output portion is a piston movably received in the output hydraulic chamber that is hydraulically connected to the output portion such that an input action received by the input portion results in a sensing action applied by the output piston. The output chamber may be a cylinder, in such a case the effective surface area of the piston is determined substantially by the diameter of the cylinder.

Optionally, the hydraulic transmission system includes an output bellows having a first open end and a second closed end, wherein the first open end is in fluid communication with the input portion, and wherein the output portion of the hydraulic transmission system includes the second closed end of the bellows. In this case, the output portion is the second closed off end of the bellows that is hydraulically connected to the input portion such that an input action received by the input portion results in a sensing action applied by the second closed off end of the output bellows. The bellows may be cylindrical. In this case, the effective surface area of the input portion is determined substantially by the diameter of the closed end of the bellows. It will be appreciated that bellows may be closed off by the bellows itself or by another suitable element.

As described above the input and output portions may be implemented in different ways. It will be clear that the input portion and output portion need not be implemented in the same manner. In other words, the hydraulic transmission system may include an input bellows hydraulically connected to an output piston movably received by an output hydraulic chamber. It is also conceivable that the input portion and output portion are implemented in the same manner. For example, the hydraulic transmission system may include input bellows and output bellows. It is noted that bellows are well suited because bellows can be designed to be compressible in a direction parallel to the longitudinal extent of the bellows (i.e. a preferred direction of the sensor) and be incompressible in a direction perpendicular to the longitudinal extent of the bellows.

Optionally, the hydraulic transmission system comprises a compensation system including a reservoir in fluid communication with the hydraulic transmission system such that hydraulic fluid may flow between the hydraulic transmission system and the reservoir. The compensation system has at least the purpose to reduce or completely eliminate background signal on sensors, and as such allow for the sensor to operate in a wider range of physical effects without loss of range, sensitivity or precision. The reservoir is arranged to be filled with an hydraulic fluid or liquid. A flow resistance within the hydraulic transmission system between the input portion and the output portion is less than a flow resistance between the hydraulic transmission system and the reservoir of the compensation system. This difference in flow resistance results in a flow timescale, e.g. a response time constant, of the overall system that prevents the compensation system from responding to rapid changes. As such, the compensation system acts as a rigid body in rapid (short) timescale inputs and as a flexible body in slow (long) timescale inputs.

It will be appreciated that flow resistance depends on the viscosity of the fluid in the compensation system, the cross-section, for example diameter, of the flow conduit, the length of the flow conduit, the stiffness of the input and output portions, and a balancing force acting on the fluid or liquid filling the reservoir, e.g. due to reservoir pressure or other spring element at the reservoir. An increase in the viscosity, a reduction in diameter of the conduit and/or an increase in length of the conduit will contribute to a slow down of the speed at which fluid can flow to and from the compensation system. This results in an increase in the response time of the system. On the other hand, an increase in the stiffness of the input and/or output portions, e.g. the moving surfaces, will increase the push force exerted on the fluid and hence increase the speed at which fluid can flow to and from the compensation, resulting in a reduction in the response time. In reverse, if the balancing force at the reservoir side increases, the flow to the reservoir will be slower and hence a longer time constant can be achieved. In specific embodiments, the fluid of the compensation system may be the same as the fluid in the hydraulic transmission system. Alternatively, the fluid of the compensation system may be different from the fluid of the hydraulic transmission system.

In the case that the fluid of the hydraulic transmission system is silicone oil, preferably, the viscosity of the silicone oil is greater than 60 Pa·s. In this way, it is possible to achieve flow timescales of a few seconds with compact conduit lengths of a few millimeters and conduit diameters of a few millimeters.

In reaction to a static force fluid may flow between the hydraulic transmission system and the reservoir. In this way, the sensor device may compensate for slow changing effects, while maintaining its sensing ability of rapid effects. An example of an effect to be compensated is a slow change in ambient pressure, for example due to a subsea sensor moving from a depth of for example of 10 m to a depth of 300 m.

Optionally, the flow resistance within the hydraulic transmission system between the input portion and the output portion, and the flow resistance between the hydraulic transmission system and the reservoir results in a flow timescale that is at least X times slower than Y, wherein X is in the range of 3-100, preferably in the range of 10-1000, and more preferably X is greater than 100, and wherein Y is in the range of 0.1 Hz to 10 Hz. Y represents the slowest change desired to be recorded in its full amplitude and phase by the sensor device. Generally, the slowest change desired to be recorded in its full amplitude and phase by the sensor system is in the range of 0.1 Hz to 10 Hz. It has been found that choosing X in the above defined ranges results in the desired compensation of changes slow changing effects, while still maintaining the ability to sense fast changing effects.

Optionally, the reservoir is arranged for exerting a balancing force on the fluid or liquid filling the reservoir, or the reservoir includes means for exerting a balancing force on the fluid or liquid filling the reservoir. For example, the reservoir may include a movable surface arranged to change a volume of the reservoir in fluid communication with the hydraulic transmission system. The movable surface has a predetermined spring constant. As such, the movable surface is arranged to provide a balancing force acting on the fluid or liquid filling the reservoir. In an embodiment, the movable surface is a movable piston provided in the reservoir and attached to the reservoir by a spring. The movable surface exerts a force on the hydraulic fluid in a direction towards the hydraulic transmission system. In a set of alternatives, the moving surface can be a flexible membrane, or a bellow cap.

Optionally, the reservoir is arranged to be filled with a volume of pressurized gas that is substantially insoluble in the hydraulic fluid of the reservoir. In this way, the pressurized gas exerts a force on the hydraulic fluid of the reservoir towards the hydraulic transmission system. The pressurized gas acting on the hydraulic fluid has a predetermined spring constant which is determined by the pressure of the pressurized gas in the reservoir.

Optionally, the sensor device further comprises a pre-tensing spring. The optical fiber may be pre-stressed such as to be tensed, thereby acting, also, as a spring having a first spring constant of positive value. For exerting such pre-tension force, a pre-tensing spring may be connected with a first connecting portion thereof to one of the input portion of the hydraulic transmission system and the output portion of the hydraulic transmission system. The pre-tensing spring may be connected with a second connecting portion thereof to an element exterior to the hydraulic transmission system.

Preferably, the pre-tensing spring is a bi-stable spring having a first and a second stable deflection position and an unstable equilibrium negative stiffness range around an unstable equilibrium position between the first and second stable deflection position. The optical fiber is pre-stressed such as to be tensed, thereby acting as a spring having a first spring constant of positive value. The bi-stable spring is connected with a first connecting portion thereof to one of the input portion of the hydraulic transmission system and the output portion of the hydraulic transmission system. The bi-stable spring is connected with a second connecting portion thereof to an element exterior to the hydraulic transmission system. The optical fiber thereby counteracts a spring action of the bi-stable spring such as to operate the bi-stable spring in a deflection position range within the negative stiffness range. The deflection position range not including the unstable equilibrium position of the bi-stable spring.

In this way the stiffness of the system is reduced. This may be achieved while maintaining the tension in the optical fiber comprising the intrinsic fiber optic sensor. Moreover, the amplifying effect of the negative stiffness mechanism provided by the bi-stable spring effectively decreases the spring constant of the optical fiber. Hence, the intrinsic fiber optic sensor provides a stronger response to an input action, causing the optical sensor device of the present invention to be more sensitive. All this may be obtained without any modification to the optical fiber. Hence, using an optical fiber including an intrinsic fiber optic sensor of minimal diameter (e.g. 60 micron), the sensitivity of the system can be increased by including the bi-stable spring and operating it in the deflection position range wherein the bi-stable spring acts as a negative spring. It will be appreciated that if the first connecting portion of the bi-stable spring is connected to the input portion of the hydraulic transmission system, then the effect of the bi-stable element will be dependent on the transmission ratio T, and will be scaled by by $T^2$.

It is conceivable that the bi-stable spring is used in combination with a hydraulic transmission ratio greater than 1. In this way, the bi-stable spring may compensate for some of the sensitivity lost in the trade off for an increase in resonance frequency. It is also conceivable to use the bi-stable spring in combination with a hydraulic transmission ratio less than 1. In this case the sensitive of the system is further increased by the bi-stable spring. The element exterior to the hydraulic transmission system may be the same element that the second connecting portion of the fiber is connected to.

If the sensor is designed to measure pressure, the input portion of the hydraulic transmission system alone may be suitable for receiving the force. This also holds when the input portion is a flexible membrane, a piston, or a bellows.

Optionally, the device further comprises a sensing transducer connected to the input portion of the hydraulic transmission system. The sensing transducer is arranged for receiving the input action and applying the input action to the input portion of the hydraulic transmission system. Optionally, the sensing transducer is an inertial mass.

When the sensor is designed to sense acceleration, a sensing transducer external to the input portion of the hydraulic system may be connected to the input portion. For example, the mass of a bellows or flexible member may not provide the necessary sensitivity. With an external sensing transducer, such as a mass, the desired sensitivity of the sensor device can be achieved. A mass of 0.1-0.5 kg has been found to work well with compact sized sensors.

The sensing transducer may be arranged for receiving a dynamic input action, such as a vibration, acceleration or acoustic action. The sensing transducer may be connected to the input portion to limit cross-axis sensitivity which is the sensitivity of the optical sensor device to an input action that is not aligned with the devices preferred axis for receiving an input action.

The present invention also relates to a sensor apparatus comprising one or more optical sensor devices according to the invention for sensing one or more input actions applied in one or more directions.

In this way one or more sensor devices according to the invention are arranged such that the one or more sensor devices receive input actions applied in one or more direction. Typically this is achieved by using similar sensor devices but arranging the devices such that the preferred axis for receiving an input action of one sensor is at a predefined angle with respect the preferred axis of another sensor.

The present invention also relates to an optical accelerometer comprising a first optical sensor device according to the present invention, arranged for receiving a first input action applied in a first direction and for converting the first input action into a first sensing action in a first sensing direction. The optical accelerometer comprises a second optical sensor device according to the present invention arranged for receiving a second input action applied in a second direction and for converting the second input action into a second sensing action in a second sensing direction. The optical accelerometer comprises a third optical sensor device according to the invention arranged for receiving a third input action applied in a third direction and for converting the third input action into a third sensing action in a third sensing direction. Additionally, the optical accelerometer comprises a sensing transducer being an inertial mass. The sensing transducer is connected to the input portion of the first optical sensor device, the input portion of the second optical device, and the input portion of the third optical device. The reference body of the first optical sensor, the second optical sensor and the third optical sensor are the same reference body. The first input direction, the second input direction and the third input direction are orthogonal.

In this way the 3-axis optical accelerometer can be made smaller as the sensing transducer is shared amongst the first, second and third input portions. It will be clear that the reference bodies of the first, second and third sensor are the same or are all connected to a single reference body such that the first, second, and third sensor devices are in a fixed configuration with respect to each other. It will be appreciated that the first, second, and third sensor devices may each have a different transmission ratio to accommodate for different design constraints in the different input directions.

Optionally, the first sensing direction is parallel to the first input direction, the second sensing direction is parallel to the second input direction, and the third sensing direction is parallel to the third input direction. In this way the accelerometer is arranged for receiving input actions from three orthogonal input directions and for converting input actions in the respective input directions to sensing actions parallel to the respective input directions. In such a configuration the sensor devices are generally arranged around the sensing transducer being an inertial mass.

Optionally, the first input direction is parallel to the first sensing direction, wherein the second input direction is perpendicular to the second sensing direction, wherein the third input direction is perpendicular to the third sensing direction, and wherein the first second, and third sensing directions are parallel to a longitudinal extent of the sensor.

In this way the sensor can be made more compact. Such a configuration facilitates the connections of the fiber at the output portion of the three sensor devices and to, for example, the reference body. Additionally, such a configuration facilitates stringing along multiple sensors, for example, in a seismic cable. It will be appreciated that the optical fibers extend in a direction parallel to the longitudinal extent of the sensor and the seismic cable.

Optionally, the transmission ratio of the hydraulic transmission system of the first optical sensor can be greater than 1 to increase operational frequency, f0. The transmission ratio of the second and third optical sensors can be less than 1 in order to increase to increase sensitivity. In this way, for example, an accelerometer can be built that has different sensitivities and operation frequency bandwidths in different directions while maintaining a single mass-fiber system. In one specific example, effects caused by moving the accelerometer in a direction parallel to its longitudinal extent can be recorded differently than those in transverse direction. Thus the accelerometer may have different detection sensitivities in different directions while using a single transduction element (e.g. inertial mass).

Optionally, the accelerometer is arranged for incorporation in a seismic cable, and the accelerometer has a longitudinal extent parallel to the longitudinal extent of the cable.

If the accelerometer is incorporated in a seismic cable, effects from towing the cable in the water may be reduced by increasing the operation frequency in the input direction, first input direction, parallel to the longitudinal extent of the cable and the sensor. It may be desirable to increase sensitivity in the second and third input direction.

Optionally, the reference body of the optical accelerometer is shaped as a portion of an outer cylinder and is arranged to be coupled to a cylindrically shaped reinforced core of the seismic cable. The reference body is preferably a longitudinal portion of an outer cylinder such that the reference body may be coupled to the reinforced core without threading the reinforced core through the reference body. More preferably the reference body is approximately a longitudinal one third portion of an outer cylinder (approximately 120 degrees). In this way the reference body of the sensor occupies about one third of the outer cylinder of the cable, and allows for other devices to be coupled to the cable.

The present invention also relates to a seismic cable comprising a sensor device according to the invention and/or a sensor apparatus according to the invention and/or an optical accelerometer according the invention. The seismic cable may be one of a seismic streamer and a downhole cable.

Thus an optical accelerometer is provided comprising a reference body, a first optical fiber including an intrinsic fiber optic sensor, a second optical fiber including an intrinsic fiber optic sensor, and a third optical fiber including an intrinsic fiber optic sensor. The accelerometer comprises a first hydraulic transmission system including a first input portion in hydraulic communication with a first output portion. The accelerometer comprises a second hydraulic transmission system including a second input portion in hydraulic communication with a second output portion. The accelerometer further comprises a third hydraulic transmission system including a third input portion in hydraulic communication with a third output portion.

The first, second, and third hydraulic transmission systems are each connected to the reference body such that the respective input portion and respective output portion of each hydraulic transmission system are movable with respect to the reference body.

The first optical fiber is connected with a first connecting portion thereof to the first output portion of the first hydraulic transmission system and with a second connecting portion thereof to an element exterior to the hydraulic transmission system, for example the reference body. The intrinsic fiber optic sensor of the first optical fiber is positioned between the first connecting portion and the second connecting portion.

The second optical fiber is connected with a first connecting portion thereof to the second output portion of the second hydraulic transmission system and with a second connecting portion thereof to an element exterior to the second hydraulic transmission system, for example the reference body. The intrinsic fiber optic sensor of the second optical fiber is positioned between the first connecting portion and the second connecting portion.

The third optical fiber is connected with a first connecting portion thereof to the third output portion of the third hydraulic transmission system and with a second connecting portion thereof to an element exterior to the third hydraulic transmission system, for example the reference body. The intrinsic fiber optic sensor of the third optical fiber is positioned between the first connecting portion and the second connecting portion.

The first input portion of the first hydraulic transmission system is arranged for receiving a first input action, in a first input direction, and the first hydraulic transmission system is arranged for converting the first input action received by the first input portion to a first sensing action applied to the first optical fiber by the first output portion, in a first sensing direction, such as to modify strain in the first optical fiber dependent on said first input action.

The second input portion of the second hydraulic transmission system is arranged for receiving a second input action, in a second input direction, and the second hydraulic transmission system is arranged for converting the second input action received by the second input portion to a second sensing action applied to the second optical fiber by the second output portion, in a second sensing direction, such as to modify strain in the second optical fiber dependent on said second input action.

The third input portion of the third hydraulic transmission system is arranged for receiving a third input action, in a third input direction, and the third hydraulic transmission system is arranged for converting the third input action received by the third input portion to a third sensing action applied to the third optical fiber by the third output portion, in a third sensing direction, such as to modify strain in the third optical fiber dependent on said third input action.

The optical accelerometer comprises a sensing transducer being an inertial mass. The sensing transducer is connected to the first input portion, the second input portion, and the third input portion. The first, second, and third input directions are orthogonal.

It will be appreciated that all features discussed above in reference to the sensor device may be applied to one or more of the sensor devices incorporated in the optical accelerometer according to the invention and incorporated in the sensor apparatus according to the invention.

Optionally, any one of the first, second, and third sensor devices may comprise a compensation system including a reservoir in fluid communication with the hydraulic transmission system of the respective sensor device such that hydraulic fluid may flow between the hydraulic transmission system and the reservoir, wherein a flow resistance within the respective hydraulic transmission system between the input portion and the output portion is less than a flow resistance between the respective hydraulic transmission system and the respective reservoir. The reservoir is arranged for exerting a balancing force, or includes means for exerting a balancing force, on a fluid or liquid in the reservoir, wherein the balancing force is tuned at least partly on the basis of Earth's gravity. As the balancing force is tuned on the basis of Earth's gravity, it may be tuned to substantially compensate for a gravitational effect in any or all of the input directions. Thus the 3-axis accelerometer may be arranged to compensate for a gravitational effect in each input direction of the first, second, and third sensor devices. The gravitational effect is compensated in a way that a dynamic (measurement) range of the accelerometer is substantially free from restriction by the gravitational acceleration field.

It is also conceivable that the balancing force is tuned such that the gravitational effect is partially compensated. It will be appreciated that partially preferably mean compensating for 80-95% of the gravitational effect. In this way the remaining sensitivity of the optical accelerometer to Earth's gravity in each of the input directions allows the gravitational direction to be determined with sufficient accuracy. In a further example, the extracted direction information of the gravitational direction is processed together with seismic vibrations received in response of seismic sources (actuators or airguns) and recorded by the 3-axis accelerometers such that the incoming vibration amplitude and phase information is directly correlated to the direction of the incoming vibration in a way that a full three dimensional mapping of the geological formations in a survey area can be made.

It will be appreciated that the reservoir may be arranged for exerting the balancing force on the fluid or liquid filling the reservoir. For example, the reservoir may include a movable surface arranged to change a volume of the reservoir in fluid communication with the hydraulic transmission system. The movable surface has a predetermined spring constant. As such, the movable surface is arranged to provide a balancing force acting on the fluid or liquid filling the reservoir. In an embodiment, the movable surface is a movable piston provided in the reservoir and attached to the reservoir by a spring. The movable surface exerts a force on the hydraulic fluid in a direction towards the hydraulic transmission system. In a set of alternatives, the moving surface can be a flexible membrane, or a bellow cap.

It is also conceivable that the reservoir includes means for exerting a balancing force on the fluid or liquid filling the reservoir, for example, the reservoir may be filled with a volume of pressurized gas that is substantially insoluble in the hydraulic fluid or liquid of the reservoir. In this way, the pressurized gas exerts a balancing force on the hydraulic fluid of the reservoir towards the hydraulic transmission system. The pressurized gas acting on the hydraulic fluid has a predetermined spring constant which is determined by the pressure of the pressurized gas in the reservoir.

In a further embodiment, a large chain or array of these sensors allow for a large area to be surveyed efficiently, either on land or subsea.

The present invention also relates to a method sensing an input force comprising the steps of: providing a sensor device comprising a reference body, an optical fiber including an intrinsic fiber optic sensor, and a hydraulic transmission system including an input portion in hydraulic communication with an output portion, wherein the hydraulic transmission system is connected to the reference body such that the input portion and output portion are movable with respect to the reference body; wherein the optical fiber is connected with a first connecting portion thereof to the output portion of the hydraulic transmission system and with a second connecting portion thereof to an element exterior to the hydraulic transmission system, wherein the intrinsic fiber optic sensor is positioned between the first connecting portion and the second connecting portion; receiving an input action at the input portion of the hydraulic transmission system; converting the input action received by the input portion of the hydraulic transmission system to a sensing action applied to the optical fiber by the output portion such as to modify strain in the optical fiber dependent on said input action.

It will be appreciated that the features described above in relation to one or more of the sensor device, sensor apparatus, and optical accelerometer, also apply to the method described above.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIG. 5C schematically illustrates an optical sensor device in accordance with a sixth embodiment;

FIG. 8 schematically illustrates an example of an optical sensor apparatus according to the invention.

DETAILED DESCRIPTION

Fiber optic sensing schemes are considered ideal for high speed high accuracy detection of various effects, owing to the high bandwidth characteristics of optical fibers and rapid and accurate switching capabilities of (semiconductor) lasers. Additionally, fiber optic sensors are passive, require less energy then their electronic counterparts and are less susceptible to transmission loss. As such, many new generation dynamic sensors are based on fiber optic sensors.

Sensitivity and operation frequency bandwidth are two of the main performance criteria for dynamic fiber optic sensors. The operation bandwidth of fiber optic sensors is often limited by the mechanical resonance frequency of the transducer assembly as it is highly desirable to operate the sensors at frequencies significantly below resonance frequency, especially when the sensing transducer includes an inertial mass. As such, there exists a need to push the resonance to higher frequencies as much as possible while maintaining sufficient sensitivity. However, added inertia and decrease of system rigidity are both factors that lower the resonance frequency undesirably.

Figure 1:
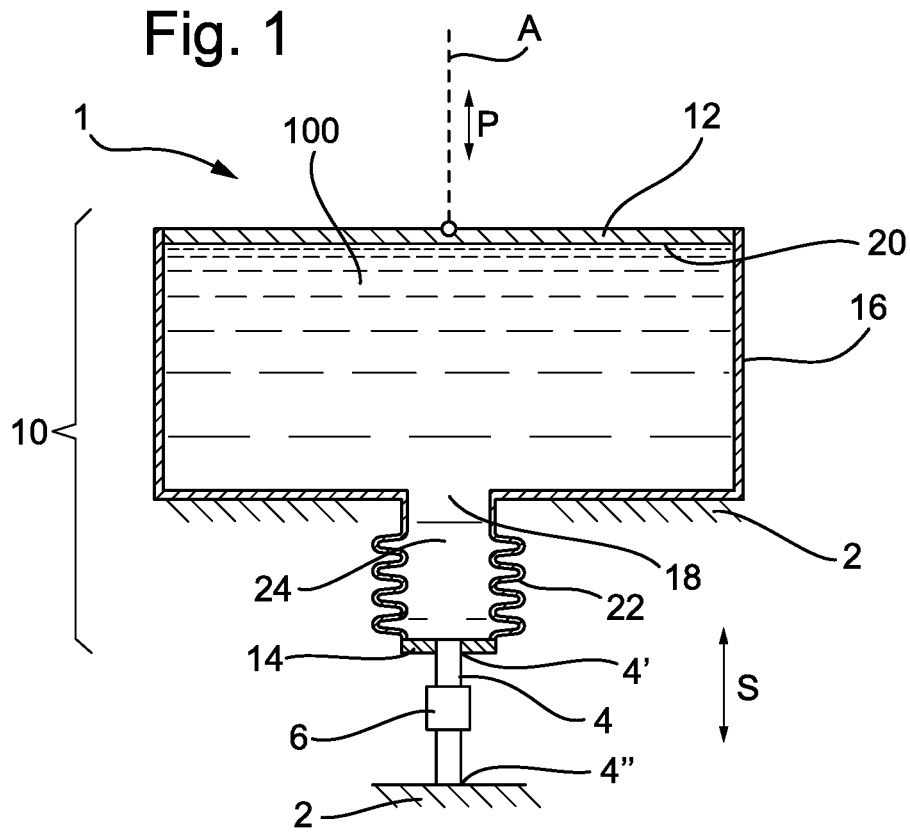
FIG. 1 schematically illustrates an optical sensor device in accordance with a first embodiment.

A first example of a sensor device 1 is depicted in FIG. 1. The optical sensor device comprises a reference body 2, an optical fiber 4 including an intrinsic fiber optic sensor 6, in this example an FBG, and a hydraulic transmission system 10. The hydraulic transmission system is filled with an incompressible liquid 100, in this example silicon oil. The hydraulic transmission system 10 includes an input portion 12 in hydraulic communication with an output portion 14. The optical fiber 4 is connected with a first connecting portion 4' thereof to the output portion 14 of the hydraulic transmission system and with a second connecting portion 4" thereof to an element exterior to the hydraulic transmission system. In this example, the optical fiber 4 is connected with the second connecting portion 4" thereof to the reference body 2. The intrinsic fiber optic sensor 6 is positioned between the first connecting portion 4' and the second connecting portion 4". Fiber 4 is pre-stressed such as to be tensed between its first connecting portion 4' and its second connecting portion 4".

In this example, the input portion 12 is a flexible membrane. The hydraulic transmission system 10 includes an input hydraulic chamber 16 having a first open end 18 in fluid communication with the output portion 14 and a second end 20 closed off by the flexible membrane. The input hydraulic chamber is partially closed off at the open first end 18 by the reference body 2 to which the hydraulic transmission system 10 is connected. In this example, the hydraulic transmission system 10 includes output bellows 22 having a first open end 24 and a second closed end forming the output portion 14. The first open end 24 is in fluid communication with the input portion. In this example, the output portion 14 of the hydraulic transmission system is formed by the second closed end of the bellows, and the first connecting portion 4' of the fiber is directly connected to the second closed off end of the output bellows 24. However it is conceivable that a connecting element is used to facilitate the connection of the fiber to the bellows.

It will be appreciated that using a flexible membrane for the input and/or output portion represents a preferred embodiment. However, other types of membranes and/or mechanical arrangements can be used for obtaining similar results. For example, in a particular embodiment a non-flexible element, such as, e.g., a piston or similar arrangement, can be used for receiving an input action and/or applying a sensing action.

The input portion 12 of the hydraulic transmission system 10 is arranged for receiving an input action. As an additional sensing transducer is not included in this example, the input action P results from a pressure variation acting on the input portion 12, i.e., the flexible membrane. In this example, the input portion 12 of the hydraulic transmission system 10, i.e., the flexible membrane, is configured to receive an input action P having a direction substantially parallel to an preferred axis A of the sensor device. The preferred axis A of the optical sensor device is in this example substantially parallel to a direction in which the flexible membrane is movable, and substantially perpendicular to a surface of the input portion 12, in this example the flexible membrane.

The hydraulic transmission system 10 is arranged for converting the input action P received by the input portion 12 of the hydraulic transmission system 10 to a sensing action S applied to the optical fiber 4 by the output portion 14 such as to modify strain in the optical fiber 4 dependent on said input action. As the input action P is applied to the input portion 12, the flexible membrane, the input portion 12 moves, with respect to the reference body, displacing a volume of fluid, which in turn causes the output bellows 22 to expand, in the direction S, reducing the strain on the fiber 4. The output bellows 22 examples moving the output portion relative to the reference body 2. This change in strain is measurable by for example an interrogating laser.

As depicted in FIG. 1, the optical fiber 4 extends between the first connecting point 4' and the second connecting point 4" in a direction substantially parallel to the sensing direction S. In this way, the fiber is stretched substantially longitudinally.

The transmission ratio T in this example is 20:1, and is greater than 1. It is conceivable that the transmission ration is as high as 20:1 or even higher. This ratio is substantially determined by the ratio of the effective surface area of the input portion 12 and the effective surface area of the output portion 14. In this example the effective surface area of the output portion is approximately 12 mm$^2$. Therefore the effective surface area of the input portion is approximately 240 mm$^2$. Generally in seismic sensors, the effective surface area of the output portion is greater than 12 mm$^2$, and in the range of 12 mm$^2$-80 mm$^2$. In this way, the effect of input action P on the intrinsic fiber optic sensor 6 is reduced, and system rigidity is increased. Thus the resonance frequency of the sensor device 1 is increased at the cost of sensitivity.

The effective surface area of the input or output portion may be defined as a volume of liquid displaced by the respective portion divided by a distance travelled by a connection point located on the respective portion. In this example, the connection point is chosen as a center of the respective portion. It will be appreciated that for a flexible membrane the effective surface area may be less than the actual surface area of the membrane as the membrane does not move uniformly. This may result from the way the edges of the membrane are attached. Whereas a closed off end of a bellows may provide more uniform movement, resulting in an effective surface area that is closer to the closed off end of the bellows actual surface area.

Figure 2:
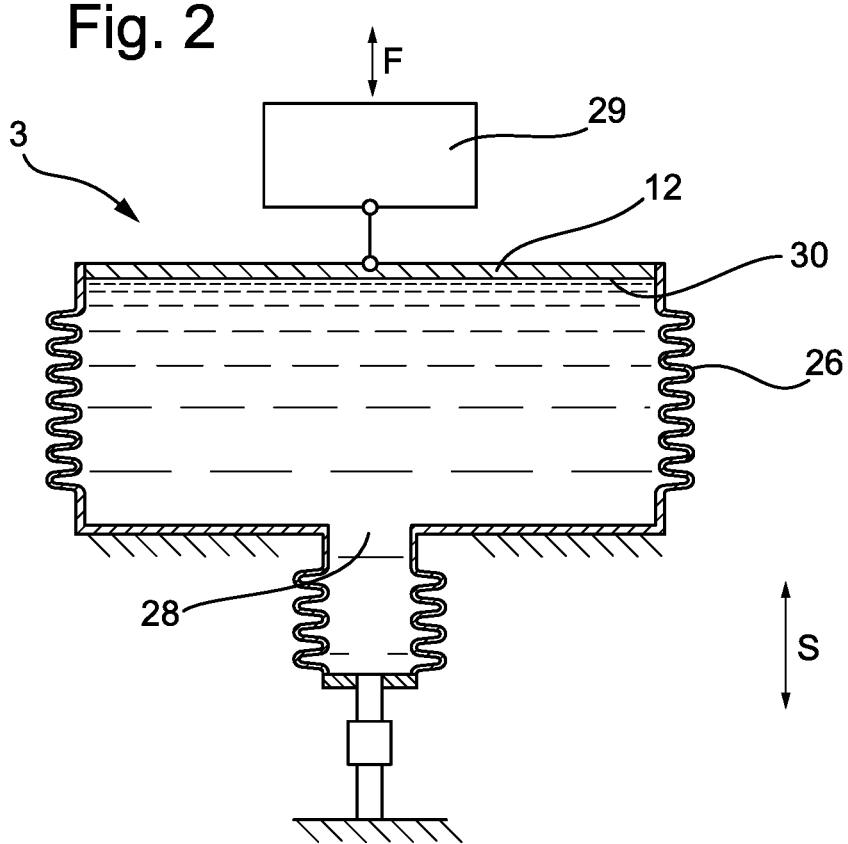
FIG. 2 schematically illustrates an optical sensor device in accordance with a second embodiment.

A second example of a sensor device 3 is shown in FIG. 2. Features of the second example that correspond to features of the first example are labeled with the same reference number. Sensor device 3 differs from sensor device 1 of the first example in that sensor device 3 comprises input bellows 26. A first open end 28 of the input bellows is in fluid communication with the output portion 14. Additionally, the input portion 12, being the second closed end 30 of the input bellows 26, has a sensing transducer, mass 29, connected to it. Thus the mass 29 and its connection to the input portion 12 are arranged for receiving an input action and applying the input action to the input portion 12 of the hydraulic transmission system. In this example, the mass 29 is 0.5 kg, and in practice the mass is chosen between 0.1-0.5 kg mass. The sensor device 3 is arranged for receiving input actions (such as accelerations and/or vibrations) in a direction F and for converting these input actions into a sensing action S. The input bellows 28 are cylindrical and have a diameter that is substantially the same as the input cylinder of the first example. The ratio of the effective surface area of the input portion 12 to the effective surface area of the output portion 14 is the same as in the first example, and therefore the transmission ratio T of the sensor device 3 is also 20:1. Other transmission ratios T are conceivable.

Figure 3:
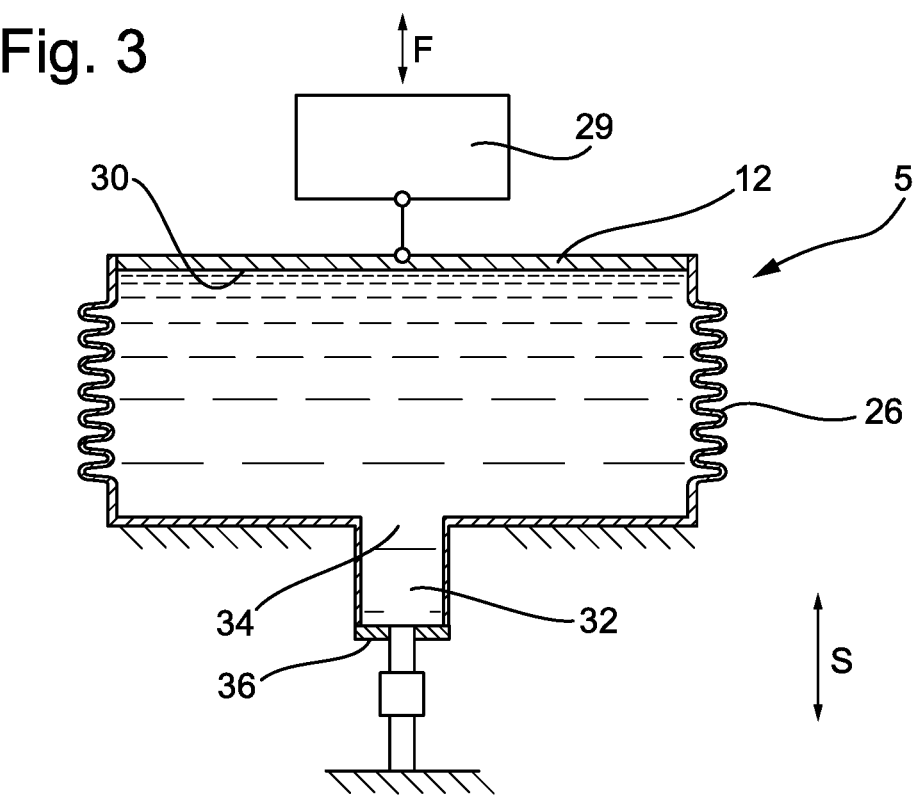
FIG. 3 schematically illustrates an optical sensor device in accordance with a third embodiment.

A third example of a sensor device 5 is shown in FIG. 3. Features of the third example that correspond to features of the previous examples are labeled with the same reference number. Sensor device 5 differs from sensor device 3 of the second example in that instead of an output bellows, sensor device 5 includes an output hydraulic chamber 32, formed as a cylinder. The first open end 34 of the cylinder is in fluid communication with the input portion 12. A movable output piston 36 is received in the output hydraulic chamber 32. The output portion is the movable output piston 36. The output piston 36 had a diameter that corresponds to the diameter of the output hydraulic chamber 32, formed as a cylinder. The surface area of the output piston 36 is in this example 20 times smaller than the surface area of the input portion 12 formed by the second closed off end of the input bellows 26. Therefore the transmission ration T of the sensor device 5 is 20:1.

Figure 4:
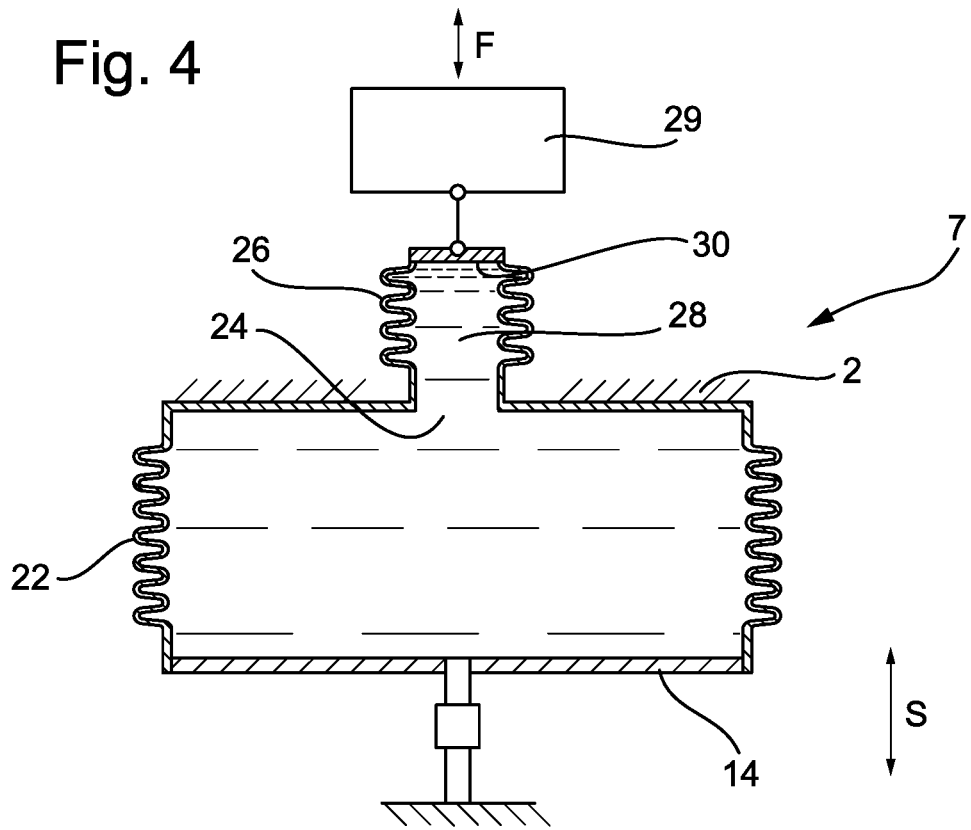
FIG. 4 schematically illustrates an optical sensor device in accordance with a fourth embodiment.

A fourth example of a sensor device 7 is shown in FIG. 4. Features of the fourth example that correspond to features of the previous examples are labeled with the same reference number. Sensor device 7 includes an input bellows 26 and output bellows 22. The first open end 28 of the input bellows is in fluid communication with the first open end 24 of the output bellows and are connected via the reference body 2. Both bellows are arranged for compression and expansion in a direction parallel to the input action F. As in sensor devices 3 and 5, a mass 28 is connected to the input portion 12, in this example the second closed off end 30 of the input bellows 26. The output bellows 22 is closed off by the output portion 14. The input portion 12 and the output portion 14 are movable in a direction parallel to the input action F. In this example, the surface area of the input portion 12 is approximately 20 times smaller than the surface area of the output portion. Therefore the transmission ration T is 1:20, and is less than 1. The length of the input bellows 26 is approximately 5 mm and the length of the output bellows 22 is approximately 10 mm. This results in a compact sensor.

With the transmission ratio of sensor device 7 being smaller than 1, a sensing action S applied to the fiber 4 is larger than the input action F. In this way, the sensitivity of the device 7 is increased at the cost of operational frequency and rigidity of the system.

Figure 5A:
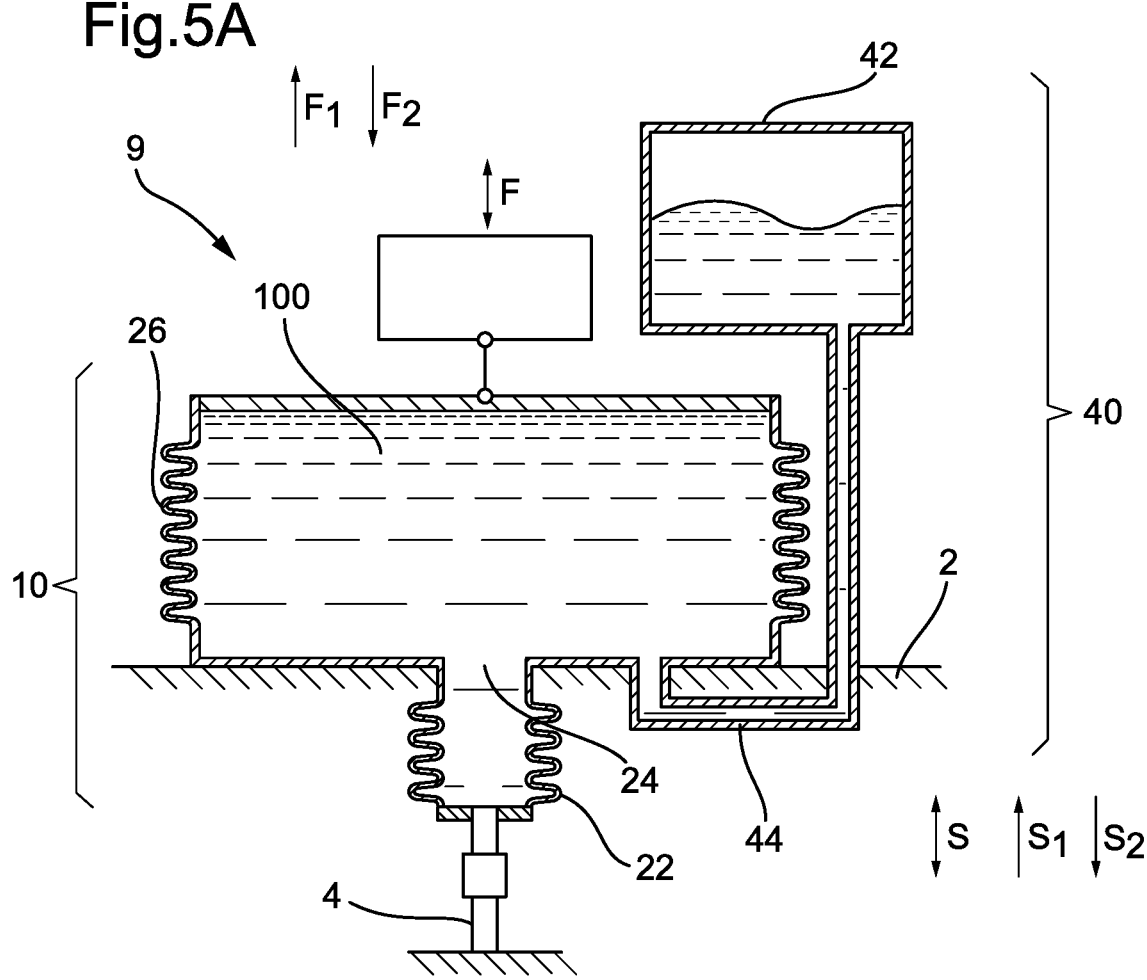
FIGS. 5A and 5B schematically illustrate an optical sensor device in accordance with a fifth embodiment.

A fifth example of a sensor device 9 is shown in FIG. 5A. Features of the fifth example that correspond to features of the previous examples are labeled with the same reference number. It is noted that sensor device 9 is substantially similar to sensor device 3. The hydraulic transmission system 10 of sensor device 9 comprises a compensation system 40 including a reservoir 42 in fluid communication with the hydraulic transmission system 10, such that hydraulic fluid may flow between the hydraulic transmission system 10 and the reservoir 42. In this example the reservoir 42 is connected by a conduit 44. A flow resistance within the hydraulic transmission system between the input portion 12 and the output portion is less than a flow resistance between the hydraulic transmission system 10 and the reservoir 42. This difference in flow resistance results in a flow timescale, e.g. a response time constant, of the overall system that allows the compensation system to relax in response to events with a slow time constant and be rigid in response to rapidly changing inputs.

As in the previous examples, the hydraulic transmission system 10 is filled with silicone oil 100, which is a substantially incompressible liquid. Silicone oil 100 may have a wide range of viscosity. In this example, Silicone oil having a viscosity of 60 Pa·s is used. It will be appreciated that the viscosity of the fluid, in this example silicone oil, has an impact on the flow resistance. For example, with silicone oil of 60 Pa·s or greater, it is possible to achieve flow timescales of a few seconds with compact conduit lengths of approximately 5-20 millimeters and conduit diameters of a few millimeters The flow resistance in the hydraulic transmission system 10 between the input bellows 26 and output bellows 22 through the first open end 24 of the output bellows will be significantly small as the flow time response scales inversely quadratic with flow diameter and linearly with flow length.

In this example conduit 44 has a diameter of 0.1 mm and a length of 5 mm. Preferably the diameter of conduit 44 is in the range of 0.1-1 mm and the length of conduit 44 is in the range of 5-20 mm. The response time of the compensation system 40 can be approximated as 0.1 to 20 seconds depending on the spring rate of the compensation reservoir system. This is between 1 and 200 times slower than the slowest change desired to be recorded in its full amplitude and phase by the sensor. In this example, this seismic sensor is arranged to record a slowest desired change of 10 Hz.

Figure 5B:
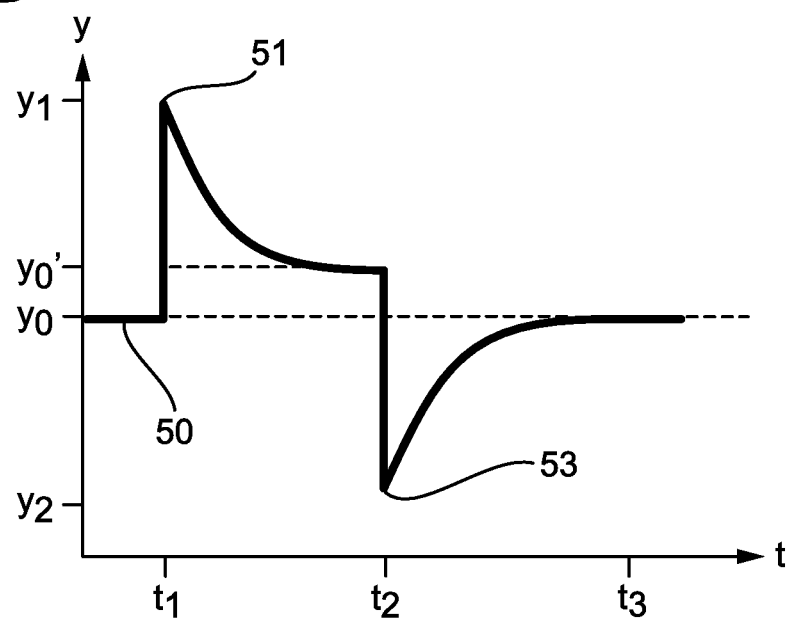

In this way the compensation system 40 compensates for slow changing effects, while allowing the hydraulic sensing system to maintain sensitivity for rapid changing effects. The compensation system 40 will be explained in detail using FIG. 5B. The axis t is represents time and the y-axis is the amount of stretching in fiber 4. The initial amount of stretching is the fiber is shown at segment 50 and corresponds to value y0. At time t1, an input action F1 is received at the input portion 12 and converted into a sensing action S2. The input action F1 causes the fiber 4 to stretch and results in peak 51 corresponding to a value of y1. If the input action F1 is applied between t1 and t2, the compensation system 40 in this case is designed to compensate for the continuous action of F1 resulting in the fluid moving from the reservoir 42 to the hydraulic transmission system 10. The amount of stretching in fiber 4 is compensated to value y0'. At t2 an input action F2 is applied to the sensor device 9. The input action F2 is converted into a sensing action S2 resulting in less stretching of the fiber 4. The input action F2 is applied continuously and is compensated for by the compensation system 40, such that by time t3 the sensing action S2 the stretching of fiber 4 has returned to its initial value.

A sixth example of sensor device is shown in FIG. 5C. Features of the sixth example that correspond to features of the previous examples are labeled with the same reference number. It is noted that sensor device 9 is substantially similar to the sensor device depicted in FIG. 5A, with the exception of the addition of a movable piston 43 provided in the reservoir 42, and attached to a reservoir wall by a spring 45. In this example, the remaining uncompensated signal level y0' can be tuned as well as the response time by adding a spring constant on the moving surface provided in the reservoir 42, in this example piston 43 and spring 45. It is also conceivable that the reservoir 42 expands with a given spring rate. The movable surface, piston 43, is arranged to change a volume of the reservoir 42 in fluid communication with the hydraulic transmission system. Furthermore, the movable surface, piston 43, is attached to the reservoir 42 by the spring 45, and therefore the movable surface has a predetermined spring constant based on the spring constant of spring 45.

By increasing the stiffness of the spring 45, the y0' amount can be increased while flow timescale is decreased. In yet another embodiment, the spring can be tuned to achieve different flow timescale and an uncompensated measurement y0'.

It will be appreciated that instead of a spring 45, a similar effect can be obtained by using pressurized gas that is largely insoluble in the liquid in the reservoir. In a further embodiment the gas pocket can be made leaky to the outside for further tunability such that the y0' amount can be made to be even zero for a full compensation.

Figure 6A:
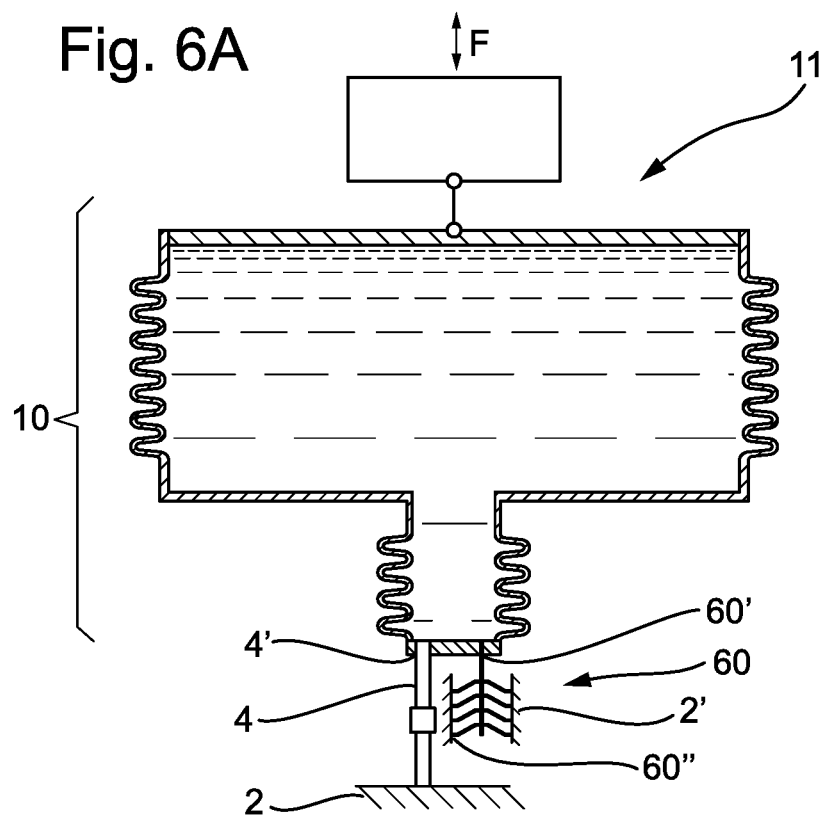
FIG. 6A schematically illustrates an optical sensor device in accordance with a seventh embodiment.

A seventh example of a sensor device 11 is shown in FIG. 6A. Features of the seventh example that correspond to features of the previous examples are labeled with the same reference number. It is noted that sensor device 11 is substantially similar to sensor device 3 shown in FIG. 2. However sensor device 11 further comprises a bi-stable spring 60. The bi-stable spring 60 has a first and a second stable deflection position and an unstable equilibrium negative stiffness range around an unstable equilibrium position between the first and second stable deflection position.

Figure 6B:
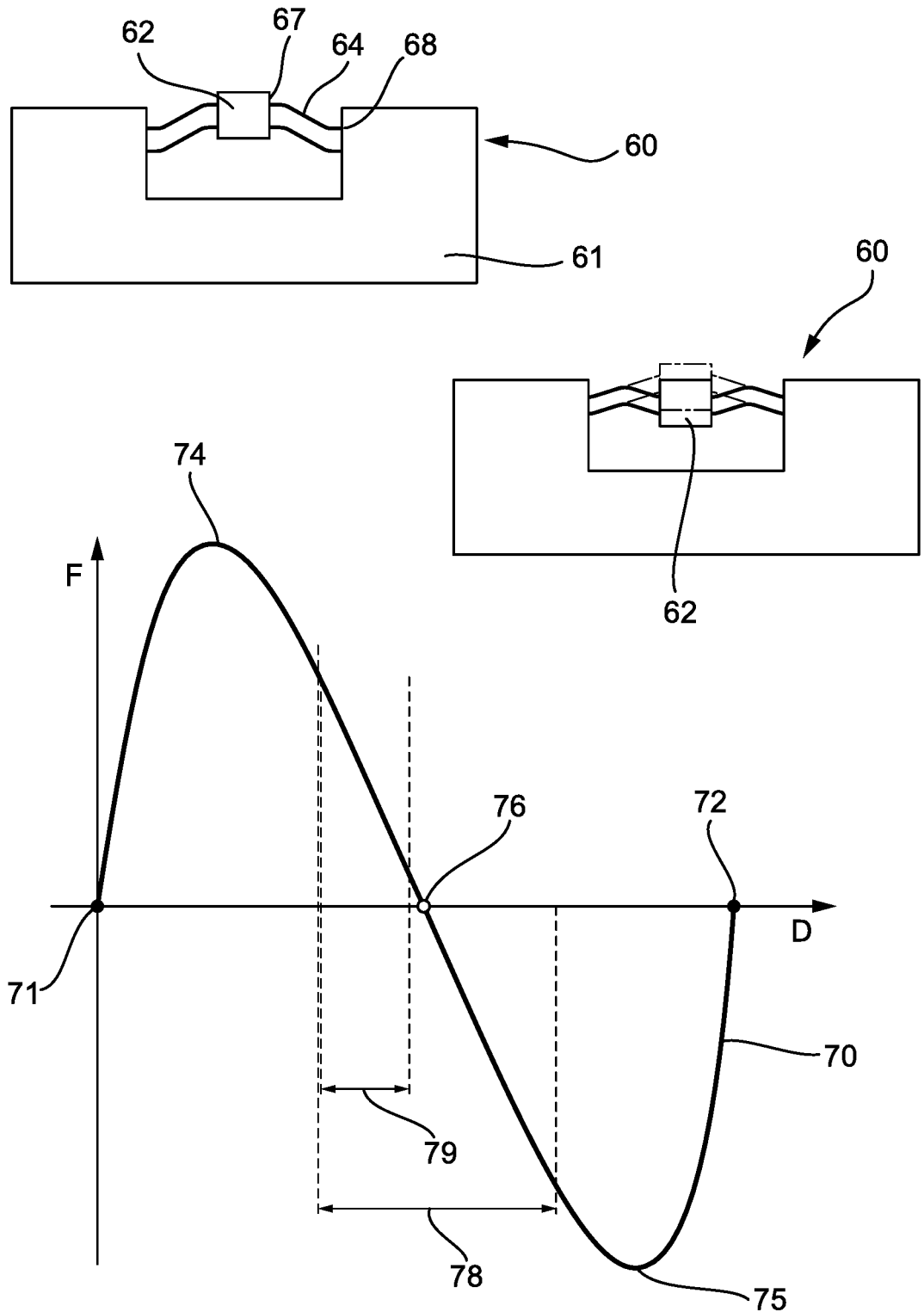
FIG. 6B schematically illustrates a bi-stable spring.

An example of a bi-stable spring 60 is shown in FIG. 6B. The bi-stable spring 60 comprises a deflection element 62 connected with leaf springs 64 between the walls of a fixed element 61. The leaf springs 64 extend with straight angles (perpendicular) from the fixed element 61 and from the deflection element 62. The leaf springs 64 are pre-stressed such as to be buckled to fit in between the walls of fixed element 61.

The spring force, F, of the bi-stable spring is on the vertical axis, and the horizontal axis shows the deflection, D, of element 62 from the first stable position 71. The curve 70 thus illustrates the spring force at each deflection position. Moving the deflection element 62 towards the other side of the spring 60, spring force will attempt to push the deflection element 62 back to the first stable position 71. This force will first increase until a maximum is reached in point 74. Then, the force will decrease again although it remains to be directed towards the first stable position 71 until the unstable equilibrium position 76 is reached. In this first part of the range, i.e. between position 71 and position 76, the force is of positive value indicating that it is directed towards the first stable position 71. Pushing the deflection element 62 further, past the unstable equilibrium 76, will cause the force to become negative—hence being directed at the second stable position 76. Thus the spring will snap to the other stable position. The force on the right hand side of point 76 will have a minimum at point 75, beyond which it will increase again until the second stable position 72 is reached.

In the configuration of FIG. 6B, the deflection element 62 across the full deflection range between stable positions 71 and 72, behaves in a symmetric fashion on the left hand and right hand side with respect to the unstable equilibrium position 76.

As the optical fiber 4 is pre-stressed it acts as a spring having a first spring constant of positive value, in this example 50 N/mm. Preferably, the optical fiber is pre-stressed and acts as a spring constant of positive value in the range of 10-100 N/mm. It will be appreciated that the overall spring constant depends on the fiber length, which may vary between several millimeters to several centimeters. A first connecting portion 60' of the bi-stable spring 60 is connected to the output portion 14. A second connecting portion 60", generally the walls of fixed element 61, is connected to an element 2' exterior to the hydraulic transmission system 10. In this example element 2' is fixed to the reference body 2. The optical fiber 4 thereby counteracts a spring action of the bi-stable spring 60, and the bi-stable spring operates in a deflection position range 79 within the negative stiffness range. The deflection position range 79 not including the unstable equilibrium position of the bi-stable spring. The stiffness of the fiber is thus at least partially compensated for and results in an increase in sensitivity in sensor device 11

Figure 7:
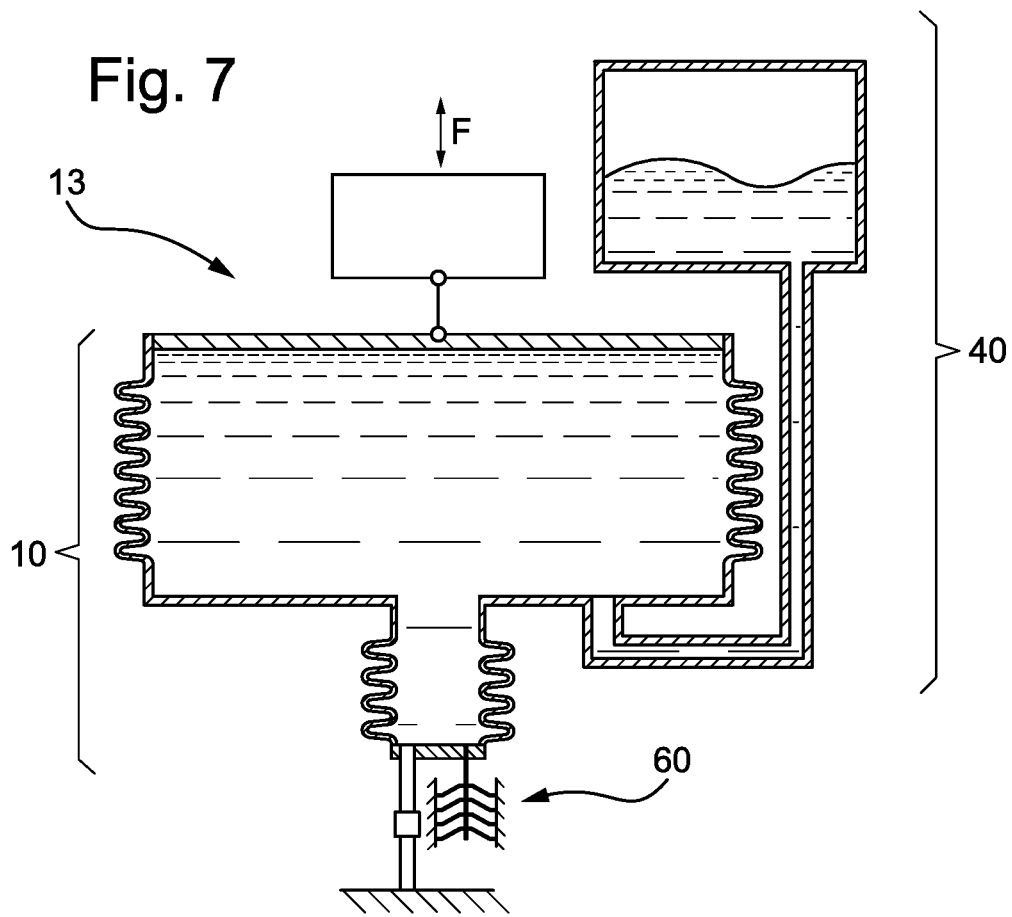
FIG. 7 schematically illustrates an optical sensor device in accordance with a eighth embodiment.

An eighth example of a sensor device 13 is shown in FIG. 7. Features of the eighth example that correspond to features of the previous examples are labeled with the same reference number. It is noted that sensor device 13 is substantially similar to sensor device 11 shown in FIG. 6A. However sensor device 13 further comprises a compensation system 40 as describe in sensor device 9 of FIG. 5A. In this way, the bi-stable spring 60 may compensate for some of the sensitivity lost in the trade off for an increase in resonance frequency. As the transmission ration of the sensor device 13 is less than 1. Additionally, the compensation system 40 compensates for slow changing effects.

FIG. 8 shows an optical sensor apparatus 101 comprising one or more optical sensor devices according to the invention, in this example three sensor devices 101A, 101B, and 101C similar to sensor device 3 describe with regard to FIG. 2. The sensor apparatus 101 is an accelerometer and is arranged for sensing input actions applied in three directions A, B, and C. Directions A, B, and C are perpendicular to each other.

Sensor device 101A is arranged for receiving an input action in a direction parallel to direction A at the input portion 112A and for converting the input action into a sensing action applied to the optical fiber 104A by output portion 114A in a direction parallel to direction A thus modifying strain in the optical fiber 104A dependent on the input action. Sensor device 101B is arranged for receiving an input action in a direction parallel to direction B at the input portion 112B and for converting the input action into a sensing action applied to the optical fiber 104B by output portion 114B in a direction parallel to direction B thus modifying strain in the optical fiber 104B dependent on the input action. Sensor device 101C is arranged for receiving an input action in a direction parallel to direction A at the input portion 112C and for converting the input action into a sensing action applied to the optical fiber 104C by output portion 114C in a direction parallel to direction A thus modifying strain in the optical fiber 104C dependent on the input action.

The hydraulic transmission systems of sensor devices 101A, 101B, and 101C include input bellows 126A, 126B, and 126C, each in fluid communication with output bellows 122A, 122B, and 122C. In this example, the input portion 112A, 112B, and 112C is formed by the sensing transducer 111, being an inertial mass. The inertial mass closes off the input bellows 126A, 126B, and 126C an end. The other end is in fluid communication with the output portion 114A, 114B and 114C.

In this example the output portions 114A, 114B, and 114C include a connecting element 115A, 115B, and 115C for facilitating connection of the optical fiber 104A, 104B, and 104C at their respective connecting portions 104A', 104B', and 104C'. The fibers 104A, 104B, and 104C are pre-stressed and connected at their respective second connecting portions 104A", 104B", and 104C" to the reference body 102. The intrinsic fiber optic sensor of each sensor device 101A, 101B, and 101C, being FBGs 106A, 106B, and 106C are positioned respectively between the first connecting portion 104A', 104B', and 104C' and the second connecting portion 104A", 104B", and 104C".

Figure 9:
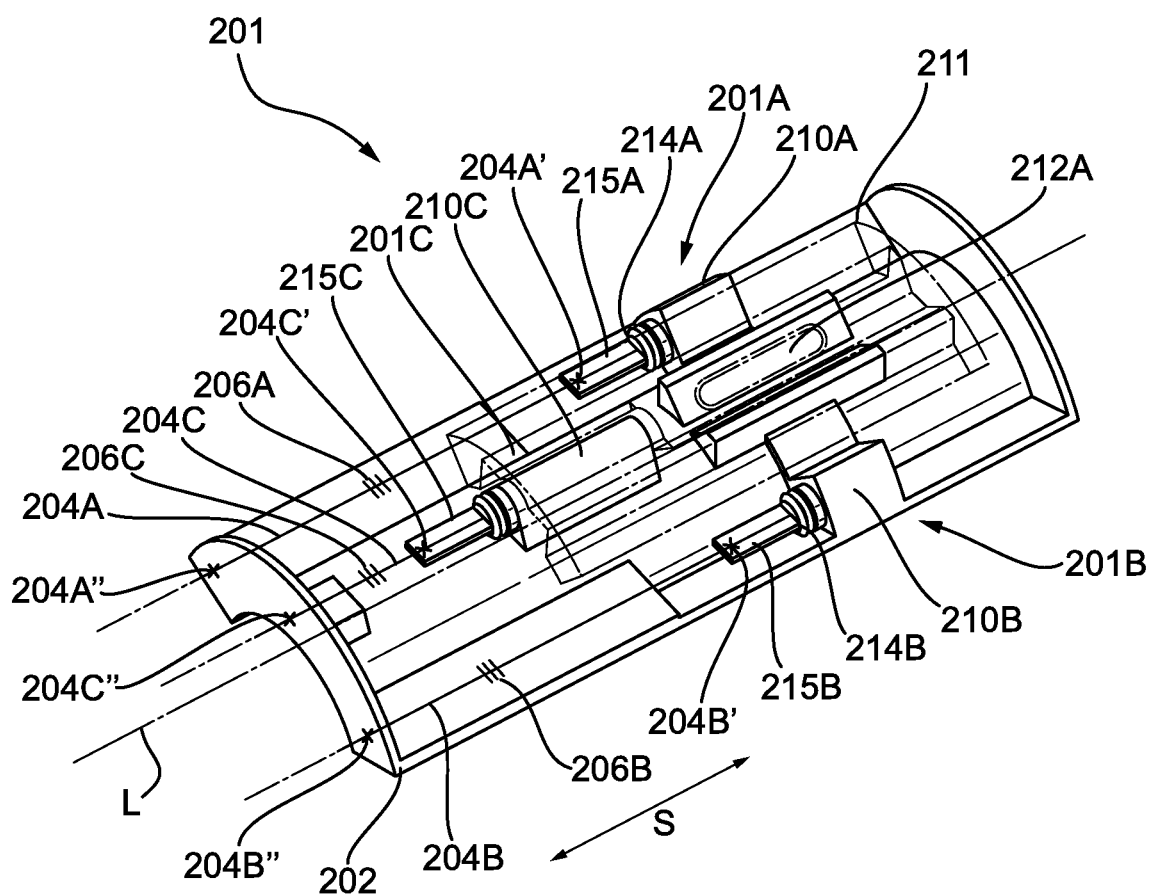
FIGS. 9 and 10 schematically illustrate an example of an optical accelerometer according to the invention.
Figure 10:
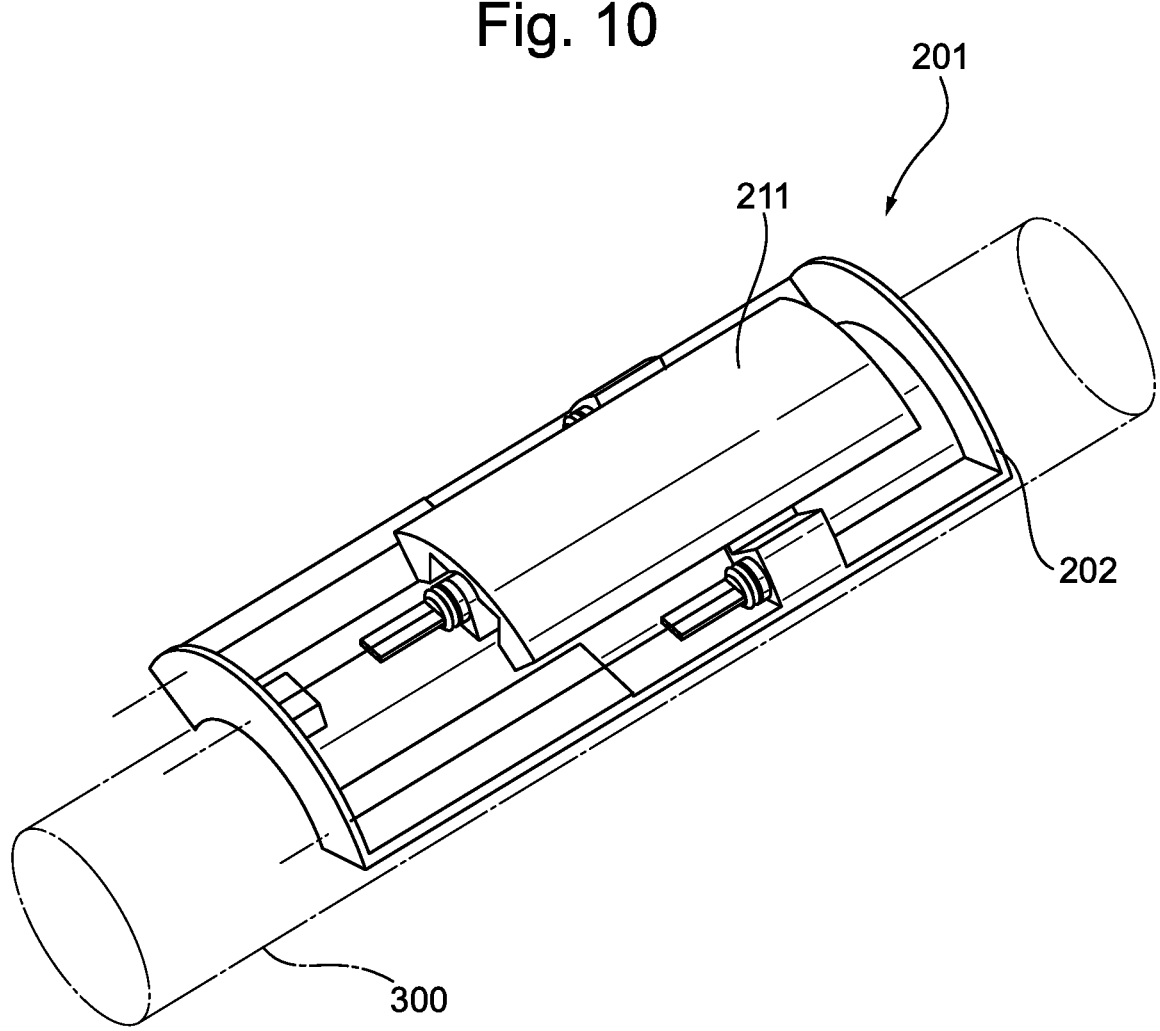

In this example the transmission ratios TA, TB, and TC are substantially equal as the diameters of input bellows 126A, 126B, and 126C are substantially the same, and the diameters of the output bellows 122A, 122B, and 122C are substantially the same. The transmission rations TA, TB, and TC are all less than 1. In this example they are equal to 20:1. Therefore the resonance frequency of the sensor apparatus 101 is increased at the cost of sensitivity. It is noted that the mass 111 is approximately 0.1-0.5 kg. In this example, the dimensions of the sensor are be 50 mm×50 mm×50 mm. This results in a compact sensor apparatus and thus increases versatility and eases integration FIGS. 9 and 10 show an optical accelerometer 201. The accelerometer 201 comprises a first optical sensor device 201A, a second optical sensor device 201B, and a third optical sensor device 201C. The first optical sensor device 201A is arranged for receiving a first input action applied in a first direction, perpendicular to the input portion 212A, and for converting the first input action into a first sensing action in a sensing direction S. The third optical sensor device 201C is arranged for receiving a third input action applied in a third direction, parallel to the longitudinal extent L of the accelerometer 201, and for converting the third input action into a third sensing action in a sensing direction S. The second optical sensor device 201B is arranged for receiving a second input action applied in a second direction, perpendicular to the third direction of the third input action and perpendicular to the first direction of the first input action, and for converting the second input action into a second sensing action in a sensing direction S.

The accelerometer 201 includes a sensing transducer 211 being an inertial mass. In this example the mass is 0.5 kg. Preferably the mass 211 is in the range 0.1-0.8 kg. The mass 211 is connected to the input portion 212A of the first device 201A, the input portion of the second device 201B and the input portion of the third device 201C. It is noted that in FIGS. 9 and 10, the input portions of the second and third device are not visible.

The accelerometer 201 includes a reference body 202, which in this example is formed as a portion of an outer cylinder (approximately 120 degrees) and is arranged to be coupled to cylindrically shaped reinforced core of a seismic cable 300 pictured in FIG. 10. The reference body 202 is the common reference body of the first second and third sensor devices 201A, 201B, and 201C. The accelerometer 201, and the reference body 202 have a longitudinal extent L which is parallel to the longitudinal extent of the cable 300.

The optical accelerometer is arranged for receiving input actions in three perpendicular directions and for converting the input actions with the hydraulic transmissions systems 210A, 210B, and 210C to first second and third sensing actions S all parallel to the longitudinal extent of the accelerometer 201. This facilitates the connections of the fiber at the output portions 214A, 214B, and 214C of the three sensor devices to the reference body 202. Additionally, such a configuration facilitates stringing along multiple sensors along a seismic cable, as the fibers 204A, 204B, and 204C can be run along the core 300. Fibers 204A, 204B, and 204C may include multiple FBG 206A, 206B, 206C, in this way fiber 204A, 204B, and 204C may be used in multiple optical sensors 201 coupled to core 300. It is conceivable, that the FBG 206A, 206B, and 206C are provided on a single fiber, and that each FBG, 206A, 206B, and 206C, has different optical characteristics such that they can be interrogated in real-time from the same interrogation unit, preferably located remotely to the sensor unit.

Thus the first and third input directions are perpendicular to the sensing direction S, which is the same as the first and third sensing directions. The second input direction is parallel to the longitudinal extent of the accelerometer L and also parallel to the sensing direction S. The hydraulic transmission systems 210A and 210C allow the redirection of the first and second input actions without complicated mechanics or major transmission loss.

Fibers 204A, 204B and 204C, extending parallel to the longitudinal extent L of the accelerometer 201 and parallel to the sensing direction S, are attached at a first connecting portions 204A', 204B', and 204C' respectively to connecting elements 215A, 215B, and 215C. The second connecting portions 204A", 204B", and 204C" of fiber 204A, 204B, and 204C are attached to the reference body 202. The intrinsic fiber optic sensor of each sensor device 201A, 201B, and 201C, being FBGs 206A, 206B, and 206C are positioned respectively between the first connecting portion 204A', 204B', and 204C' and the second connecting portion 204A", 204B", and 204C".

In accelerometer 201, the hydraulic transmission systems 210A, 210B, and 210C include input chamber closed off by a flexible membrane. The flexible membrane forms the input portion. The input portions of the device 201A, 201B, and 201C are in hydraulic communication with their respective output portions 214A, 214B, and 214C. The hydraulic transmission systems 210A, 210B, and 210C also include an output bellows having a closed of end that forms the respective output portions 214A, 214B, and 214C. Both the input portions and the output portions are movable with respect to the reference body 202. The output portions are movable in a direction parallel to S and parallel to the longitudinal extent L of the accelerometer 201. The input portions are movable in a direction substantially parallel to the first, second and third input directions.

In this example, the transmission ratios TA, TB, TC are not the same. The transmission ratio of the hydraulic transmission system 210C is chosen to help reduce the effects from towing the cable in the water. The transmission ration TC may be 2:1 or even 1:1. On the other hand the transmission ratio TA and TB of hydraulic systems 210A and 201B is chosen to increase sensitivity in the first and second input direction. TA and TB are both 6:1.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:
1. An optical sensor device, comprising:
a reference body;
an optical fiber including an intrinsic fiber optic sensor; and
a hydraulic transmission system including an input portion in hydraulic communication with an output portion,
wherein the hydraulic transmission system is connected to the reference body such that the input portion and the output portion are movable with respect to the reference body, wherein movement of the input portion and the output portion results in movement of another portion according to a transmission ratio,
wherein the optical fiber is connected with a first connecting portion thereof to the output portion of the hydraulic transmission system and with a second connecting portion thereof to an element exterior to the hydraulic transmission system, wherein the intrinsic fiber optic sensor is positioned between the first connecting portion and the second connecting portion, wherein the input portion of the hydraulic transmission system is arranged for receiving an input action and the hydraulic transmission system is arranged for converting the input action received by the input portion of the hydraulic transmission system to a sensing action applied to the optical fiber by the output portion to modify strain in the optical fiber dependent on the input action.

2. The optical sensor device according to claim 1, wherein the optical fiber is connected with the second connecting portion thereof to at least one of the reference body or a further element that is fixed relative to the reference body.

3. The optical sensor device according to claim 1, wherein the input portion is a flexible membrane, and the hydraulic transmission system includes an input hydraulic chamber having a first open end in fluid communication with the output portion and a second end closed off by the flexible membrane.

4. The optical sensor device according to claim 1, wherein the input portion is a movable input piston, and the hydraulic transmission system includes an input hydraulic chamber having a first open end in fluid communication with the output portion and wherein the movable input piston is received in the input hydraulic chamber.

5. The optical sensor device according to claim 1, wherein the hydraulic transmission system includes an input bellows having a first open end and a second closed end, wherein the first open end is in fluid communication with the output portion, and wherein the input portion of the hydraulic transmission system is the second closed end of the bellows.

6. The optical sensor device according to claim 1, wherein the output portion is a flexible membrane, and the hydraulic transmission system includes an output hydraulic chamber having a first open end in fluid communication with the input portion and a second end closed off by the flexible membrane.

7. The optical sensor device according to claim 1, wherein the output portion is a movable output piston, and the hydraulic transmission system includes an output hydraulic chamber having a first open end in fluid communication with the input portion and wherein the movable output piston is received in the output hydraulic chamber.

8. The optical sensor device according to claim 1, wherein the hydraulic transmission system includes an output bellows having a first open end and a second closed end, wherein the first open end is in fluid communication with the input portion, and wherein the output portion of the hydraulic transmission system includes the second closed end of the bellows.

9. The optical sensor device according to claim 1, wherein the hydraulic transmission system has a transmission ratio greater than 1.

10. The optical sensor device according to claim 9, wherein an effective surface area of the input portion in hydraulic communication with the output portion is greater than an effective surface area of the output portion in hydraulic communication with the input portion.

11. The optical sensor device according to claim 1, wherein the hydraulic transmission system has a transmission ratio less than 1.

12. The optical sensor device according to claim 11, wherein an effective surface area of the input portion in hydraulic communication with the output portion is less than an effective surface area of the output portion in hydraulic communication with the input portion.

13. The optical sensor device according to claim 1, wherein the hydraulic transmission system comprises a compensation system including a reservoir in fluid communication with the hydraulic transmission system such that hydraulic fluid flows between the hydraulic transmission system and the reservoir, wherein a flow resistance within the hydraulic transmission system between the input portion and the output portion is less than a flow resistance between the hydraulic transmission system and the reservoir.

14. The optical sensor device according to claim 13, wherein the reservoir includes a movable surface arranged to change a volume of the reservoir in fluid communication with the hydraulic transmission system, wherein the movable surface has a predetermined spring constant.

15. The optical sensor device according to claim 13, wherein the reservoir is arranged to be filled with a volume of pressurized gas that is substantially insoluble in the hydraulic fluid of the reservoir, such that the pressurized gas exerts a force on the hydraulic fluid of the reservoir.

16. The optical sensor device according to claim 13, wherein the flow resistance within the hydraulic transmission system between the input portion and the output portion and the flow resistance between the hydraulic transmission system and the reservoir results in a flow timescale that is at least X times slower than Y, wherein X is in a range of 10-1000, and wherein Y is in the range of 0.1 Hz to 10 Hz.

17. The optical sensor device according to claim 1, further comprising a bi-stable spring having a first and a second stable deflection position and an unstable equilibrium negative stiffness range around an unstable equilibrium position between the first and second stable deflection position,
   wherein the optical fiber is pre-stressed to be tensed, the optical fiber thereby acting as a spring having a first spring constant of positive value,
   wherein the bi-stable spring is connected with a first connecting portion thereof to one of the input portion of the hydraulic transmission system and the output portion of the hydraulic transmission system, wherein the bi-stable spring is connected with a second connecting portion thereof to an element exterior to the hydraulic transmission system, and
   wherein the optical fiber thereby counteracts a spring action of the bi-stable spring to operate the bi-stable spring in a deflection position range within the negative stiffness range, the deflection position range not including the unstable equilibrium position of the bi-stable spring.

18. The optical sensor device according to claim 1, wherein the intrinsic fiber optic sensor comprises at least one of a Fiber Bragg Grating, a photonic crystal fiber, a birefringent fiber, a fiber laser, or a multicore fiber.

19. The optical sensor device according to claim 1, wherein the device further comprises a sensing transducer connected to the input portion of the hydraulic transmission system, wherein the sensing transducer is arranged for receiving the input action and applying the input action to the input portion of the hydraulic transmission system.

20. The optical sensor device according to claim 19, wherein the sensing transducer is an inertial mass.

21. An optical accelerometer comprising:
   a first optical sensor device arranged for receiving a first input action applied in a first direction and for converting the first input action into a first sensing action in a first sensing direction;
   a second optical sensor device arranged for receiving a second input action applied in a second direction and for converting the second input action into a second sensing action in a second sensing direction;

a third optical sensor device arranged for receiving a third input action applied in a third direction and for converting the third input action into a third sensing action in a third sensing direction;

a sensing transducer being an inertial mass;

wherein the sensing transducer is connected to an input portion of the first optical sensor device, an input portion of the second optical device, an the input portion of the third optical device;

wherein a reference body of the first optical sensor device, the second optical sensor device and the third optical sensor device are the same reference body; and wherein the first direction, the second direction and the third direction are orthogonal.

22. The optical accelerometer according to claim 21, wherein the first sensing direction is parallel to the first direction, wherein the second sensing direction is parallel to the second direction, and wherein the third sensing direction is parallel to the third direction.

23. The optical accelerometer according to claim 21, wherein the first direction is parallel to the first sensing direction, wherein the second direction is perpendicular to the second sensing direction, wherein the third direction is perpendicular to the third sensing direction, and wherein the first second and third sensing directions are parallel to a longitudinal extent of the optical accelerometer.

24. The optical accelerometer according to claim 23, wherein the transmission ratio of a hydraulic transmission system of the first optical sensor device is greater than 1, and wherein the transmission ratio of the second and third optical sensor devices is less than 1.

25. The optical accelerometer according to claim 23, wherein the transmission ratio of a hydraulic transmission system of the first optical sensor device is less than 1, and wherein a transmission ratio of the second and third optical sensor devices is greater than 1.

26. The optical accelerometer according to claim 21, wherein the optical accelerometer is arranged for incorporation in a seismic cable, and wherein the optical accelerometer has a longitudinal extent parallel to a longitudinal extent of the cable.

27. The optical accelerometer according to claim 26, wherein the reference body is shaped as a portion of an outer cylinder and is arranged to be coupled to a cylindrically shaped reinforced core of the seismic cable.

28. The optical accelerometer according to claim 21, wherein the first sensor device comprises a compensation system including a reservoir in fluid communication with a hydraulic transmission system of the first sensor device such that a hydraulic fluid flows between the hydraulic transmission system and the reservoir, wherein a flow resistance within the hydraulic transmission system between the input portion and an output portion thereof is less than a flow resistance between the hydraulic transmission system and the reservoir, and wherein the reservoir is arranged for exerting a balancing force on a fluid or liquid in the reservoir, wherein the balancing force is tuned at least partly on the basis of Earth's gravity.

29. The optical accelerometer according to claim 21, wherein the second sensor device comprises a compensation system including a reservoir in fluid communication with a hydraulic transmission system of the second sensor device such that a hydraulic fluid flows between the hydraulic transmission system and the reservoir, wherein a flow resistance within the hydraulic transmission system between the input portion and an output portion thereof is less than a flow resistance between the respective hydraulic transmission system and the reservoir, and wherein the reservoir is arranged for exerting a balancing force on a fluid or liquid in the reservoir, wherein the balancing force is tuned at least partly on the basis of Earth's gravity.

30. The optical accelerometer according to claim 21, wherein the third sensor device comprises a compensation system including a reservoir in fluid communication with a hydraulic transmission system of the third sensor device such that a hydraulic fluid flows between the hydraulic transmission system and the reservoir, wherein a flow resistance within the hydraulic transmission system between the input portion and an output portion thereof is less than a flow resistance between the hydraulic transmission system and the reservoir, and wherein the reservoir is arranged for exerting a balancing force on a fluid or liquid in the reservoir, wherein the balancing force is tuned at least partly on the basis of Earth's gravity.

31. A seismic cable comprising:
a sensor device comprising:
    a reference body;
    an optical fiber including an intrinsic fiber optic sensor; and
    a hydraulic transmission system including an input portion in hydraulic communication with an output portion,
        wherein the hydraulic transmission system is connected to the reference body such that the input portion and the output portion are movable with respect to the reference body, wherein movement of the input portion and the output portion results in movement of another portion according to a transmission ratio,
        wherein the optical fiber is connected with a first connecting portion thereof to the output portion of the hydraulic transmission system and with a second connecting portion thereof to an element exterior to the hydraulic transmission system, wherein the intrinsic fiber optic sensor is positioned between the first connecting portion and the second connecting portion,
        wherein the input portion of the hydraulic transmission system is arranged for receiving an input action and the hydraulic transmission system is arranged for converting the input action received by the input portion of the hydraulic transmission system to a sensing action applied to the optical fiber by the output portion to modify strain in the optical fiber dependent on the input action.

* * * * *